(12) United States Patent
Melanson

(10) Patent No.: US 7,804,256 B2
(45) Date of Patent: Sep. 28, 2010

(54) POWER CONTROL SYSTEM FOR CURRENT REGULATED LIGHT SOURCES

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 358 days.

(21) Appl. No.: 12/047,262

(22) Filed: Mar. 12, 2008

(65) Prior Publication Data

US 2008/0224636 A1   Sep. 18, 2008

Related U.S. Application Data

(60) Provisional application No. 60/894,295, filed on Mar. 12, 2007, provisional application No. 60/909,458, filed on Apr. 1, 2007.

(51) Int. Cl.
*G05F 1/00* (2006.01)
*H02M 3/335* (2006.01)

(52) U.S. Cl. .................. 315/291; 315/247; 315/224; 315/274; 315/307; 363/19; 363/21.01; 363/21.05; 363/23

(58) Field of Classification Search .......... 315/247, 315/246, 224, 225, 291, 297, 307–311, 185 S, 315/312–324, 274, 278, 279; 363/19, 15, 363/21.01, 23, 21.05, 21.09, 21.1, 21.11, 363/21.12, 21.13
See application file for complete search history.

(56) References Cited

U.S. PATENT DOCUMENTS

| | | |
|---|---|---|
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |

(Continued)

FOREIGN PATENT DOCUMENTS

EP   0585789 A1   3/1994

(Continued)

OTHER PUBLICATIONS

Linear Technology, "Single Switch PWM Controller with Auxiliary Boost Converter," LT1950 Datasheet, Linear Technology, Inc. Milpitas, CA, 2003.

(Continued)

*Primary Examiner*—Tuyet Vo
(74) *Attorney, Agent, or Firm*—Hamilton & Terrile, LLP; Kent B. Chambers

(57) ABSTRACT

A light emitting diode (LED) lighting system includes a PFC and output voltage controller and a LED lighting power system. The controller advantageously operates from an auxiliary voltage less than a link voltage generated by the LED lighting power system. The common reference voltage allows all the components of lighting system to work together. A power factor correction switch and an LED drive current switch are coupled to the common reference node and have control node-to-common node, absolute voltage that allows the controller to control the conductivity of the switches. The LED lighting system can utilize feed forward control to concurrently modify power demand by the LED lighting power system and power demand of one or more LEDs. The LED lighting system can utilize a common current sense device to provide a common feedback signal to the controller representing current in at least two of the LEDs.

30 Claims, 15 Drawing Sheets

U.S. PATENT DOCUMENTS

| | | |
|---|---|---|
| 4,414,493 A | 11/1983 | Henrich |
| 4,476,706 A | 10/1984 | Hadden et al. |
| 4,677,366 A | 6/1987 | Wilkinson et al. |
| 4,683,529 A | 7/1987 | Bucher |
| 4,700,188 A | 10/1987 | James |
| 4,737,658 A | 4/1988 | Kronmuller et al. |
| 4,797,633 A | 1/1989 | Humphrey |
| 4,940,929 A | 7/1990 | Williams |
| 4,973,919 A | 11/1990 | Allfather |
| 4,979,087 A | 12/1990 | Sellwood et al. |
| 4,992,919 A | 2/1991 | Lee et al. |
| 4,994,952 A | 2/1991 | Silva et al. |
| 5,206,540 A | 4/1993 | de Sa e Silva et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,477,481 A | 12/1995 | Kerth |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,781,040 A | 7/1998 | Myers |
| 5,783,909 A | 7/1998 | Hochstein |
| 5,900,683 A | 5/1999 | Rinehart et al. |
| 5,929,400 A | 7/1999 | Colby et al. |
| 5,946,202 A | 8/1999 | Balogh |
| 5,952,849 A | 9/1999 | Haigh et al. |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,150,774 A | 11/2000 | Mueller et al. |
| 6,211,626 B1 | 4/2001 | Lys et al. |
| 6,211,627 B1 | 4/2001 | Callahan |
| 6,229,271 B1 | 5/2001 | Liu |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,344,811 B1 | 2/2002 | Melanson |
| 6,385,063 B1 | 5/2002 | Sadek et al. |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,495,964 B1 | 12/2002 | Muthu et al. |
| 6,509,913 B2 | 1/2003 | Martin, Jr. et al. |
| 6,580,258 B2 | 6/2003 | Wilcox et al. |
| 6,583,550 B2 | 6/2003 | Iwasa et al. |
| 6,636,003 B2 | 10/2003 | Rahm et al. |
| 6,713,974 B2 | 3/2004 | Patchornik et al. |
| 6,727,832 B1 | 4/2004 | Melanson |
| 6,741,123 B1 | 5/2004 | Melanson et al. |
| 6,753,661 B2 | 6/2004 | Muthu et al. |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,958,920 B2 | 10/2005 | Mednik et al. |
| 6,967,448 B2 | 11/2005 | Morgan et al. |
| 6,970,503 B1 | 11/2005 | Kalb |
| 6,975,079 B2 | 12/2005 | Lys et al. |
| 7,003,023 B2 | 2/2006 | Krone et al. |
| 7,050,509 B2 | 5/2006 | Krone et al. |
| 7,064,498 B2 | 6/2006 | Dowling et al. |
| 7,064,531 B1 | 6/2006 | Zinn |
| 7,075,329 B2 | 7/2006 | Chen et al. |
| 7,078,963 B1 | 7/2006 | Andersen et al. |
| 7,088,059 B2 | 8/2006 | McKinney et al. |
| 7,102,902 B1 | 9/2006 | Brown et al. |
| 7,106,603 B1 | 9/2006 | Lin et al. |
| 7,109,791 B1 | 9/2006 | Epperson et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shteynberg et al. |
| 7,183,957 B1 | 2/2007 | Melanson |
| 7,221,130 B2 | 5/2007 | Ribeiro et al. |
| 7,233,135 B2 | 6/2007 | Noma et al. |
| 7,255,457 B2 | 8/2007 | Ducharm et al. |
| 7,266,001 B1 | 9/2007 | Notohamiprodjo et al. |
| 7,288,902 B1 | 10/2007 | Melanson |
| 7,292,013 B1 | 11/2007 | Chen et al. |
| 7,310,244 B2 | 12/2007 | Yang et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,656,103 B2 | 2/2010 | Shteynberg et al. |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0223255 A1 | 12/2003 | Ben-Yaakov |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasake et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0184895 A1 | 8/2005 | Petersen et al. |
| 2005/0207190 A1 | 9/2005 | Gritter |
| 2005/0218838 A1 | 10/2005 | Lys |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0022916 A1 | 2/2006 | Aiello |
| 2006/0023002 A1 | 2/2006 | Hara et al. |
| 2006/0125420 A1 | 6/2006 | Boone et al. |
| 2006/0226795 A1 | 10/2006 | Walter et al. |
| 2006/0261754 A1 | 11/2006 | Lee |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0103949 A1 | 5/2007 | Tsuruya |
| 2007/0182699 A1 | 8/2007 | Ha et al. |
| 2008/0174372 A1 | 7/2008 | Tucker et al. |
| 2008/0192509 A1 | 8/2008 | Dhuyvetter et al. |
| 2008/0224635 A1 | 9/2008 | Hayes |
| 2008/0259655 A1 | 10/2008 | Wei et al. |
| 2008/0278132 A1 | 11/2008 | Kesterson et al. |

| | | |
|---|---|---|
| 2009/0147544 A1 | 6/2009 | Melanson |
| 2009/0218960 A1 | 9/2009 | Lyons et al. |

FOREIGN PATENT DOCUMENTS

| | | |
|---|---|---|
| EP | 0910168 A1 | 4/1999 |
| EP | 1014563 | 6/2000 |
| EP | 1164819 A | 12/2001 |
| EP | 1213823 A2 | 6/2002 |
| EP | 1528785 A | 5/2005 |
| JP | WO 2006/022107 A2 | 3/2006 |
| WO | 01/97384 A | 12/2001 |
| WO | 0227944 | 4/2002 |
| WO | 02/091805 A2 | 11/2002 |
| WO | WO2006135584 | 12/2005 |
| WO | 2006/067521 A | 6/2006 |
| WO | 2007/026170 A | 3/2007 |
| WO | 2007/079362 A | 7/2007 |

OTHER PUBLICATIONS

Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt/://focus.ti.com/lit/ml/slup169/slup169.pdf the whole document.
PCT US2008/056737 International Search Report Written Opinion dated Nov. 11, 2009.
"HV9931 Unity Power Factor LED Lamp Driver, Initial Release" 2005, SUPERTEX Inc., Sunnyvale, CA USA.
"AN-H52 Application Note: HV9931 Unity Power Factor LED Lamp Driver" Mar. 7, 2007, SUPERTEX Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, IEEE, P1, Jun. 1 2007, pp. 1398-1404.
Spiazzi G et al: "Analysis of a High-Power-Factor Electronic Ballast for High Brightness Light Emitting Diodes" Power Electronics Specialists, 2005 IEEE 36TH Conference on Jun. 12, 2005, Piscatawa, NJ USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search PCT/US2008/062387 dated Feb. 5, 2008.
Noon, Jim "UC3855A/B High Performance Power Factor Preregulator", Texas Instruments, SLUA146A, May 1996, Revised Apr. 2004.
"High Performance Power Factor Preregulator", Unitrode Products from Texas Instruments, SLUS382B, Jun. 1998, Revised Oct. 2005.
International Search Report PCT/GB2006/003259 dated Jan. 12, 2007.
Written Opinion of the International Searching Authority PCT/US2008/056739.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.

International Search Report PCT/GB2005/050228 dated Mar. 14, 2006.
International Search PCT/US2008/062387 dated Jan. 10, 2008.
Data Sheet LT3496 Triple Output LED Driver, 2007, Linear Technology Corporation, Milpitas, CA.
News Release, Triple Output LED, LT3496.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit-Delta-Sigma Modulators, Norchip Conference, Nov. 2006 http://folk.uio.no/sayskogs/pub/A_Proposed_Stability_Characterization.pdf.
J. Turchi, Four Key Steps to Design a Continuous Conduction Mode PFC Stage Using the NCP1653, ON Semiconductor, Publication Order No. AND184ID, Nov. 2004.
Megaman, D or S Dimming ESL, Product News, Mar. 15, 2007.
J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump Power-Factor-Correction Technologies Part II: Ballast Applications, IEEE Transactions on Power Electronics, vol. 15, No. 1, Jan. 2000.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Azoteq, IQS17 Family, IQ Switch®—ProxSense™ Series, Touch Sensor, Load Control and User Interface, IQS17 Datasheet V2.00. doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
Why Different Dimming Ranges? The Difference Between Measured and Perceived Light, http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
SUPERTEX Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
SUPERTEX Inc., HV9931 Unity Power Factor LED Lamp Driver, Application Note AN-H52, Mar. 7, 2007.
SUPERTEX Inc., 56W Off-line LED Driver, 120VAC with PFC, 160V, 350mA Load, Dimmer Switch Compatible, DN-H05, Feb. 2007.
St Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F8001E, Jul. 2005.
International Search Report for PCT/US2008/051072, mailed Jun. 4, 2008.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
On Semiconductor, AND8123/D, Power Factor Correction Stages Operating in Critical Conduction Mode, Sep. 2003.
On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semconductor, NCP1606, Cost Effective Power Factor Controller, Mar. 2007.
On Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
Stmicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

J. A. Vilela Jr. et al., An Electronic Ballast with High Power Factor and Low Voltage Stress, IEEE Transactions on Industry Applications, vol. 41, No. 4, Jul./Aug. 2005.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

M. K. Kazimierczuk et al., Electronic Ballast for Fluorescent Lamps, IEEETransactions on Power Electronics, vol. 8, No. 4, Oct. 1993.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.

Q. Li et al., An Analysis of the ZVS Two-Inductor Boost Converter under Variable Frequency Operation, IEEE Transactions on Power Electronics, vol. 22, No. 1, Jan. 2007.

H. Peng et al., Modeling of Quantization Effects in Digitally Controlled DC-DC Converters, IEEE Transactions on Power Electronics, vol. 22, No. 1, Jan. 2007.

G. Yao et al., Soft Switching Circuit for Interleaved Boost Converters, IEEE Transactions on Power Electronics, vol. 22, No. 1, Jan. 2007.

C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.

W. Zhang et al., A New Duty Cycle Control Strategy for Power Factor Correction and FPGA Implementation, IEEE Transactions on Power Electronics, vol. 21, No. 6, Nov. 2006.

H. Wu et al., Single Phase Three-Level Power Factor Correction Circuit with Passive Lossless Snubber, IEEE Transactions on Power Electronics, vol. 17, No. 2, Mar. 2006.

O. Garcia et al., High Efficiency PFC Converter to Meet EN61000-3-2 and A14, Proceedings of the 2002 IEEE International Symposium on Industrial Electronics, vol. 3, 2002.

P. Lee et al., Steady-State Analysis of an Interleaved Boost Converter with Coupled Inductors, IEEE Transactions on Industrial Electronics, vol. 47, No. 4, Aug. 2000.

D.K.W. Cheng et al., A New Improved Boost Converter with Ripple Free Input Current Using Coupled Inductors, Power Electronics and Variable Speed and Variable Speed Drives, Sep. 21-23, 1998.

B.A. Miwa et al., High Efficiency Power Factor Correction Using Interleaved Techniques, Applied Power Electronics Conference and Exposition, Seventh Annual Conference Proceedings, Feb. 23-27, 1992.

Z. Lai et al., A Family of Power-Factor-Correction Controllers, Twelfth Annual Applied Power Electronics Conference and Exposition, vol. 1, Feb. 23, 1997-Feb. 27, 1997.

L. Balogh et al., Power-Factor Correction with Interleaved Boost Converters in Continuous-Inductor-Current Mode, Eighth Annual Applied Power Electronics Conference and Exposition, 1993, APEC '93. Conference Proceedings, Mar. 7, 1993-Mar. 11, 1993.

Fairchild Semiconductor, Application Note 42030, Theory and Application of the ML4821 Average Current Mode PFC Controller, Oct. 25, 2000.

Unitrode Products From Texas Instruments, BiCMOS Power Factor Preregulator, Feb. 2006.

D. Hausman, Lutron, RTISS-TE Operation, Real-Time Illumination Stability Systems for Trailing-Edge (Reverse Phase Control) Dimmers, v. 1.0 Dec. 2004.

International Rectifier, Data Sheet No. PD60230 revC, IR1150(S)(PbF), uPFC One Cycle Control PFC IC Feb. 5, 2007.

Texas Instruments, Application Report SLUA308, UCC3817 Current Sense Transformer Evaluation, Feb. 2004.

Texas Instruments, Application Report SPRA902A, Average Current Mode Controlled Power Factor Correctiom Converter using TMS320LF2407A, Jul. 2005.

Unitrode, Design Note DN-39E, Optimizing Performance in UC3854 Power Factor Correction Applications, Nov. 1994.

Fairchild Semiconductor, Application Note 42030, Theory and Application of the ML4821 Average Currrent Mode PFC Controller, Aug. 1997.

Fairchild Semiconductor, Application Note AN4121, Design of Power Factor Correction Circuit Using FAN7527B, Rev.1.0.1, May 30, 2002.

Fairchild Semiconductor, Application Note 6004, 500W Power-Factor-Corrected (PFC) Converter Design with FAN4810, Rev. 1.0.1, Oct. 31, 2003.

Fairchild Semiconductor, FAN4822, ZVA Average Current PFC Controller, Rev. 1.0.1 Aug. 10, 2001.

Fairchild Semiconductor, ML4821, Power Factor Controller, Rev. 1.0.2, Jun. 19, 2001.

Fairchild Semiconductor, ML4812, Power Factor Controller, Rev. 1.0.4, May 31, 2001.

Linear Technology, 100 Watt LED Driver, undated.

Fairchild Semiconductor, FAN7544, Simple Ballast Controller, Rev. 1.0.0.

Fairchild Semiconductor, FAN7532, Ballast Controller, Rev. 1.0.2.

Fairchild Semiconductor, FAN7711, Ballast Control IC, Rev. 1.0.2.

Fairchild Semiconductor, KA7541, Simple Ballast Controller, Rev. 1.0.3.

St Microelectronics, L6574, CFL/TL Ballast Driver Preheat and Dimming, Sep. 2003.

St. Microelectronics, AN993, Application Note, Electronic Ballast with PFC Using L6574 and L6561, May 2004.

Power Integrations, Inc., "TOP200-4/14 TOPSwitch Family Three-terminal Off-line PWM Switch", XP-002524650, Jul. 1996, Sunnyvale, California.

Texas Instruments, SLOS318F, "High-Speed, Low Noise, Fully-Differential I/O Amplifiers," THS4130 and THS4131, US, Jan. 2006.

International Search Report and Written Opinion, PCT US20080062387, dated Feb. 5, 2008.

International Search Report and Written Opinion, PCT US200900032358, dated Jan. 29, 2009.

Hirota, Atsushi et al, "Analysis of Single Switch Delta-Sigma Modulated Pulse Space Modulation PFC Converter Effectively Using Switching Power Device," IEEE, US, 2002.

Prodic, Aleksandar, "Digital Controller for High-Frequency Rectifiers with Power Factor Correction Suitable for On-Chip Implementation," IEEE, US, 2007.

International Search Report and Written Opinion, PCT US20080062378, dated Feb. 5, 2008.

International Search Report and Written Opinion, PCT US20090032351, dated Jan. 29, 2009.

Erickson, Robert W. et al, "Fundamentals of Power Electronics," Second Edition, Chapter 6, Boulder, CO, 2001.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Texas Instruments, SLUS828B, "8-Pin Continuous Conduction Mode (CCM) PFC Controller", UCC28019A, US, revised Apr. 2009.

Analog Devices, "120 kHz Bandwidth, Low Distortion, Isolation Amplifier", AD215, Norwood, MA, 1996.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

International Search Report and Written Report PCT US20080062428 dated Feb. 5, 2008.

Prodic, A. et al, "Dead Zone Digital Controller for Improved Dynamic Response of Power Factor Preregulators," IEEE, 2003.

"HV9931 Unity Power Factor LED Lamp Driver, Initial Release", SUPERTEX Inc., Sunnyvale, CA USA 2005.

Dustin Rand et al: "Issues, Models and Solutions for Triac Modulated Phase Dimming of LED Lamps" Power Electronics Specialists Conferrence, 2007. PESC 2007. IEEE, IEEE, P1, Jun. 1, 2007, pp. 1398-1404.

Written Opinion of the International Searching Authority PCT/US2008/056739 dated Dec. 3, 2008.

Written Opinion of the International Searching Authority PCT/US2008/056606 dated Dec. 3, 2008.

International Search Report PCT/US2008/062387 dated Jan. 10, 2008.

Data Sheet LT3496 Triple Output LED Driver, Linear Technology Corporation, Milpitas, CA 2007.

Linear Technology, News Release, Triple Output LED, LT3496, Linear Technology, Milpitas, CA, May 24, 2007.

International Search Report and Written Opinion for PCT/US2008/062384 dated Jan. 14, 2008.

S. Dunlap et al., Design of Delta-Sigma Modulated Switching Power Supply, Circuits & Systems, Proceedings of the 1998 IEEE International Symposium, 1998.

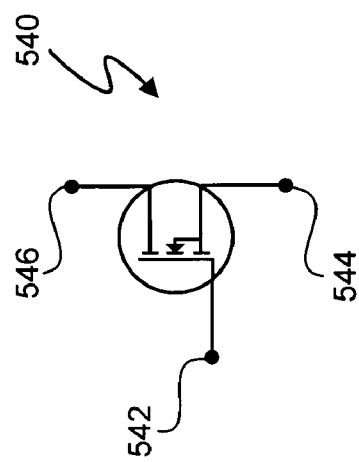
Figure 5B
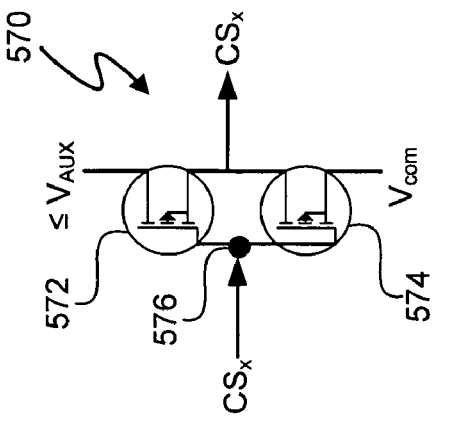
Figure 5E
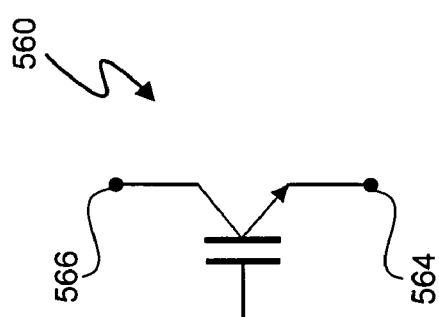
Figure 5D
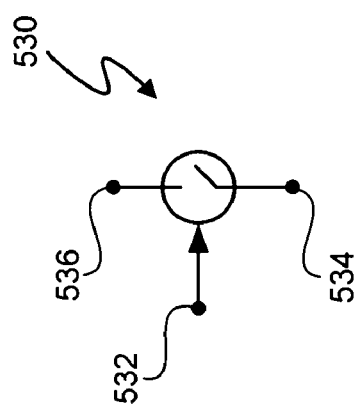
Figure 5A
Figure 5C

POWER CONTROL SYSTEM FOR CURRENT REGULATED LIGHT SOURCES

CROSS REFERENCE TO RELATED APPLICATIONS

This application claims the benefit under 35 U.S.C. §119 (e) and 37 C.F.R. §1.78 of U.S. Provisional Application No. 60/894,295, filed Mar. 12, 2007 and entitled "Lighting Fixture." U.S. Provisional Application No. 60/894,295 includes exemplary systems and methods and is incorporated by reference in its entirety.

U.S. Provisional Application No. 60/909,458, entitled "Ballast for Light Emitting Diode Light Sources," inventor John L. Melanson, and filed on Apr. 1, 2007 describes exemplary methods and systems and is incorporated by reference in its entirety.

U.S. patent application Ser. No. 12/047249, entitled "Ballast for Light Emitting Diode Light Sources," inventor John L. Melanson, and filed on Mar. 12, 2008 describes exemplary methods and systems and is incorporated by reference in its entirety.

U.S. patent application Ser. No. 11/926,864, entitled "Color Variations in a Dimmable Lighting Device with Stable Color Temperature Light Sources," inventor John L. Melanson, and filed on Mar. 31, 2007 describes exemplary methods and systems and is incorporated by reference in its entirety.

U.S. Provisional Application No. 60/909,457, entitled "Multi-Function Duty Cycle Modifier," inventors John L. Melanson and John Paulos, and filed on Mar. 31, 2007 describes exemplary methods and systems and is incorporated by reference in its entirety. Referred to herein as Melanson I.

U.S. patent application Ser. No. 12/047258, entitled "Multi-Function Duty Cycle Modifier," inventors John L. Melanson and John Paulos, and filed on Mar. 12, 2008 describes exemplary methods and systems and is incorporated by reference in its entirety. Referred to herein as Melanson II.

U.S. patent application Ser. No. 11/695,024, entitled "Lighting System with Lighting Dimmer Output Mapping," inventors John L. Melanson and John Paulos, and filed on Mar. 31, 2007 describes exemplary methods and systems and is incorporated by reference in its entirety.

U.S. patent application Ser. No. 11/864,366, entitled "Time-Based Control of a System having Integration Response," inventor John L. Melanson, and filed on Sep. 28, 2007 describes exemplary methods and systems and is incorporated by reference in its entirety. Referred to herein as Melanson III.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson IV.

U.S. patent application Ser. No. 11/967,271, entitled "Power Factor Correction Controller with Feedback Reduction," inventor John L. Melanson, and filed on Dec. 31, 2007 describes exemplary methods and systems and is incorporated by reference in its entirety. Referred to herein as Melanson V.

U.S. patent application Ser. No. 11/967,273, entitled "System and Method with Inductor Flyback Detection Using Switch Date Charge Characteristic Detection," inventor John L. Melanson, and filed on Dec. 31, 2007 describes exemplary methods and systems and is incorporated by reference in its entirety. Referred to herein as Melanson VI.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson VII.

U.S. patent application Ser. No. 11/967,272, entitled "Power Factor Correction Controller With Switch Node Feedback", inventor John L. Melanson, and filed on Dec. 31, 2007 describes exemplary methods and systems and is incorporated by reference in its entirety. Referred to herein as Melanson VIII.

U.S. patent application Ser. No. 12/047269, entitled "Lighting System with Power Factor Correction Control Data Determined from a Phase Modulated Signal," inventor John L. Melanson, and filed on Mar. 12, 2008 describes exemplary methods and systems and is incorporated by reference in its entirety.

BACKGROUND OF THE INVENTION

1. Field of the Invention

The present invention relates in general to the field of electronics and lighting, and more specifically to a system and method to controlling and/or providing power to current regulated light sources, such as light emitting diode light sources.

2. Description of the Related Art

Commercially practical incandescent light bulbs have been available for over 100 years. However, other light sources show promise as commercially viable alternatives to the incandescent light bulb. LEDs are becoming particularly attractive as main stream light sources in part because of energy savings through high efficiency light output, long life, and environmental incentives such as the reduction of mercury.

LEDs are semiconductor devices and are driven by direct current. The brightness of the LED varies in direct proportion to the current flowing through the LED. Thus, increasing current supplied to an LED increases the brightness of the LED and decreasing current supplied to the LED dims the LED.

FIG. 1 depicts a switching light emitting diode (LED) driver system 100. The LED driver system 100 includes a continuous current mode, buck-based power converter 102 to provide a constant mains voltage $V_{mains}$ to switching LED system 104. Voltage source 101 supplies an alternating current (AC) input mains voltage $V_{mains}$ to a full, diode bridge rectifier 103. The voltage source 101 is, for example, a public utility, and the AC mains voltage $V_{mains}$ is, for example, a 60 Hz/120 V mains voltage in the United States of America or a 50 Hz/230 V mains voltage in Europe. The rectifier 103 rectifies the input mains voltage $V_{mains}$. The hold-up capacitor C1 holds an approximately direct current (DC) supply voltage $V_{C1}$ across capacitor C1 relative to a reference voltage $V_R$. Supply voltage $V_{C1}$ is also the output voltage of power converter 102 and the input voltage for controller 106. Input filter capacitor C2 provides a high pass filter for high frequency components of the output voltage of rectifier 103. A thermistor NTC 1 provides in-rush current protection for power converter 102.

The controller 106 is, for example, a Supertex HV9910B integrated circuit controller available from Supertex, Inc. of Sunnyvale, Calif. The supply voltage $V_{C1}$ can vary from, for example, 8V to 450V. Controller 106 incorporates an internal voltage regulator to operate directly from the DC supply voltage $V_C$. The controller 106 provides a gate drive signal from the GATE output node to the n-channel metal oxide semiconductor field effect transistor (MOSFET) Q1. Controller 106 modulates the gate drive signal and, thus, the conductivity of MOSFET Q1 to provide a constant current to switching LED system 104. Controller 106 modifies the average resistance of MOSFET Q1 by varying a duty cycle of a pulse width modulated gate drive signal $V_{GATE}$. Resistor $R_1$ and capacitor $C_3$ provide external connections for controller 106 to the ground reference.

Controller 106 generates and uses feedback to maintain a constant current $i_{LED}$. Controller 106 receives a current feedback signal $V_{fb}$ representing a feedback voltage $V_{fb}$ sensed across sense resistor $R_2$. The feedback voltage $V_{fb}$ is directly proportional to the LED current $i_{LED}$ in LEDs 108. If the feedback voltage $V_{fb}$ exceeds a predetermined reference corresponding to a desired LED current, the controller 106 responds to the feedback voltage $V_{fb}$ by decreasing the duty cycle of gate drive signal GATE to increase the average resistance of MOSFET Q1 over time. If the feedback voltage $V_{fb}$ is less than a predetermined reference corresponding to the desired LED current, the controller 106 responds to the feedback voltage $V_{fb}$ by increasing the duty cycle of gate drive signal $V_{GATE}$ to decrease the average resistance of MOSFET Q1 over time.

The switching LED system 104 includes a chain of one or more, serially connected LEDs 108. When the MOSFET Q1 is "on", i.e. conductive, diode D1 is reversed bias and, current $i_{LED}$ flows through the LEDs and charges inductor $L_1$. When the MOSFET Q1 is "off", i.e. nonconductive, the voltage across inductor $L_1$ changes polarity, and diode D1 creates a current path for the LED current $i_{LED}$. The inductor $L_1$ is chosen so as to store enough energy to maintain a constant current $i_{LED}$ when MOSFET Q1 is "off".

FIG. 2 depicts a power control system 200, which includes a switching power converter 202. The rectifier 103 rectifies the input mains voltage $V_{mains}$ and supplies a rectified, time-varying, primary supply voltage $V_x$ to the switching power converter. The switching power converter 202 provides a power factor corrected, approximately constant voltage power to load 222.

PFC and output voltage controller 214 controls PFC switch 208 so as to provide power factor correction and regulate the output voltage $V_c$ of switching power converter 202. The goal of power factor correction technology is to make the switching power converter 202 appear resistive to the voltage source 101. Thus, the PFC and output voltage controller 214 attempts to control the inductor current $i_L$ so that the average inductor current $i_L$ is linearly and directly related to the primary supply voltage $V_x$. The PFC and output voltage controller 214 supplies a pulse width modulated (PWM) control signal $CS_0$ to control the conductivity of switch 208. In at least one embodiment, switch 208 is a field effect transistor (FET), and control signal $CS_0$ is the gate voltage of switch 208. The values of the pulse width and duty cycle of control signal $CS_o$ depend on two feedback signals, namely, the primary supply voltage $V_x$ and the capacitor voltage/output voltage $V_c$. Output voltage $V_c$ is also commonly referred to as a "link voltage".

To convert the input voltage $V_x$ into a power factor corrected output voltage $V_c$, PFC and output voltage controller 214 modulates the conductivity of PFC switch 208. To regulate the amount of energy transferred and maintain a power factor close to one, PFC and output voltage controller 214 varies the period of control signal $CS_0$ so that the input current $i_L$ tracks the changes in input voltage $V_x$ and holds the output voltage $V_C$ constant. Thus, as the input voltage $V_x$ increases, PFC and output voltage controller 214 increases the period TT of control signal $CS_0$, and as the input voltage $V_x$ decreases, PFC and output voltage controller 214 decreases the period of control signal $CS_0$. At the same time, the pulse width (PW) of control signal $CS_0$ is adjusted to maintain a constant duty cycle of control signal $CS_0$, and, thus, hold the output voltage $V_C$ constant. The inductor current $i_L$ ramps 'up' when the switch 208 conducts, i.e. is "ON". The inductor current $i_L$ ramps down when switch 208 is nonconductive, i.e. is "OFF", and supplies inductor current $i_L$ to recharge capacitor 206. The time period during which inductor current $i_L$ ramps down is commonly referred to as the "inductor flyback time". Diode 211 prevents reverse current flow into inductor 210. Inductor current $i_L$ is proportionate to the 'on-time' of switch 208. In at least one embodiment, the switching power converter 202 operates in discontinuous current mode, i.e. the inductor current $i_L$ ramp up time plus the inductor flyback time is less than the period of the control signal $CS_0$, which controls the conductivity of switch 208. Prodić, *Compensator Design and Stability Assessment for Fast Voltage Loops of Power Factor Correction Rectifiers*, IEEE Transactions on Power Electronics, Vol. 22, No. 5, September 2007, pp. 1719-1729 (referred to herein as "Prodić"), describes an example of PFC and output voltage controller 214.

In at least one embodiment, the PFC and output voltage controller 214 updates the control signal $CS_0$ at a frequency much greater than the frequency of input voltage $V_x$. The frequency of input voltage $V_x$ is generally 50-60 Hz. The frequency 1/TT of control signal $CS_0$ is, for example, between 20 kHz and 130 kHz. Frequencies at or above 20 kHz avoid audio frequencies and frequencies at or below 130 kHz avoids significant switching inefficiencies while still maintaining a good power factor of, for example between 0.9 and 1, and an approximately constant output voltage $V_C$.

Capacitor 206 supplies stored energy to load 212 when diode 211 is reverse biased. The capacitor 206 is sufficiently large so as to maintain a substantially constant output voltage $V_c$, as established by a PFC and output voltage controller 214 (as discussed in more detail below). The output voltage $V_c$ remains at a substantially constant target value during constant load conditions. However, as load conditions change, the output voltage $V_c$ changes. The PFC and output voltage controller 214 responds to the changes in voltage $V_c$ by adjusting the control signal $CS_0$ to return the output voltage $V_c$ to the target value. The PFC and output voltage controller 214 includes a small capacitor 215 to filter any high frequency signals from the primary supply voltage $V_x$.

PFC and output voltage controller 214 controls the process of switching power converter 202 so that a desired amount of energy is transferred to capacitor 206. The desired amount of energy depends upon the voltage and current requirements of load 212. To determine the amount of energy demand of load 212, the PFC and output voltage controller 214 includes a compensator 228. Compensator 228 determines a difference between a reference voltage VREF, which indicates a target voltage for output voltage $V_c$, and the actual output voltage $V_c$ sensed from node 222 and received as feedback from voltage loop 218. The compensator 228 generally utilizes technology, such as proportional integral (PI) type control, to respond to differences in the output voltage $V_c$ relative to the reference voltage $V_{REF}$. The PI control processes the error so that the PFC and output voltage controller 214 smoothly adjusts the output voltage $V_c$ to avoid causing rapid fluctuations in the output voltage $V_c$ in response to small error signals. The compensator 228 provides an output signal to the pulse width modulator (PWM) 230 to cause the PWM 230 to generate a control signal $CS_0$ that drives switch 208.

An LED lighting system controller, such as controller 106, using a supply voltage that can vary from, for example, 8V to 450V generally requires a more expensive integrated circuit relative to an integrated circuit designed to operate at a fraction of the maximum supply voltage. Using a conventional PFC controller with feedback control, when the power demand of a load quickly decreases, the output voltage $V_C$ will momentarily increase while the PFC controller responds to output voltage feedback by lowering the output voltage. Conventional switching power converters using compensators generally respond relatively slowly to large changes in load power demand. Additionally, conventional PFC controllers often include large and relatively expensive electrolytic capacitors to accommodate voltage spikes.

SUMMARY OF THE INVENTION

In one embodiment of the present invention, a light emitting diode (LED) lighting system includes a power factor correction (PFC) and LED drive controller. The controller includes a digital signal processor, coupled to the LED feedback node and configured to: operate from a digital level supply voltage; generate a PFC control signal; and generate an LED current control signal. The controller further includes a first buffer, coupled to the processor, and configured to: operate from a medium level supply voltage. The medium level supply voltage is greater than the digital level supply voltage. The controller is further configured to receive the PFC control signal and convert the PFC control signal into a PFC switch control signal to control conductivity of a high voltage PFC switch. The controller further includes a second buffer, coupled to the processor, and configured to: operate from the medium level supply voltage; receive the LED current control signal; and convert the LED current control signal into an LED current control switch signal to control conductivity of a high voltage LED current control switch.

In another embodiment of the present invention, a method includes operating a digital signal processor of a power factor correction (PFC) and output voltage controller from a digital level supply voltage and generating a PFC control signal; and generating an LED current control signal. The method further includes operating a first buffer, coupled to the processor, from a medium level supply voltage. The medium level supply voltage is greater than the digital level supply voltage; receiving the PFC control signal. The method also includes converting the PFC control signal into a PFC switch control signal to control conductivity of a high voltage PFC switch and operating a second buffer, coupled to the processor, from the medium level supply voltage. The method further includes receiving the LED current control signal and converting the LED current control signal into an LED current control switch signal to control conductivity of a high voltage LED current control switch.

In a further embodiment of the present invention, a light emitting diode (LED) lighting system includes an LED lighting power system. During normal operation of the LED lighting system the LED lighting power system generates a first source voltage relative to a common voltage. The first source voltage is a link voltage. The LED lighting power system includes a switching power supply having a power factor correction (PFC) switch, wherein during normal operation of the LED lighting system, the PFC switch of the LED lighting power system operates at a current node voltage less than or equal to 0.1 times the first source voltage relative to the common voltage reference. The LED lighting power system also includes an LED current control switch, wherein during normal operation of the LED lighting system, the LED current control switch operates at a current node voltage less than or equal to 0.1 times the first source voltage relative to the common voltage reference. The LED lighting system further includes a PFC and output voltage controller coupled to conductivity control nodes of the first and LED drive current switches. During normal operation of the lighting control system, the controller operates from a second source voltage relative to the common voltage and controls conductivity of the PFC switch and the LED current control; and at least one LED coupled to the LED current control switch.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A, 5B, 5C, and 5D depict various switches.

FIG. 5E depicts a driver circuit.

DETAILED DESCRIPTION

A light emitting diode (LED) lighting system includes a PFC and output voltage controller and a LED lighting power system. The LED lighting power system operates from a primary supply voltage derived from a primary power supply. The controller operates from an auxiliary power source supply, which provides an auxiliary voltage less than a link voltage generated by the LED lighting power system relative to a common reference voltage at a common reference node. By utilizing a lower voltage, in at least one embodiment, the controller can be manufactured at a lower cost than a comparable controller supplied by the primary power supply utilized by the LED lighting power system. Additionally, during normal operation of the LED lighting system, a power factor correction (PFC) switch and an LED drive current switch of the LED lighting system, that respectively control power factor correction and LED drive current, are coupled to the common reference node and have control node-to-common node, absolute voltage that allows the controller to control the conductivity of the switches. In at least one embodiment, the PFC switch and the LED drive current switch each have a control node-to-common node, absolute voltage within 15% of the link voltage relative to the common reference voltage. Having a current node voltage within 15% of the absolute value of the link voltage relative to the common reference voltage allows the controller to effectively control the switches.

Figure 3:
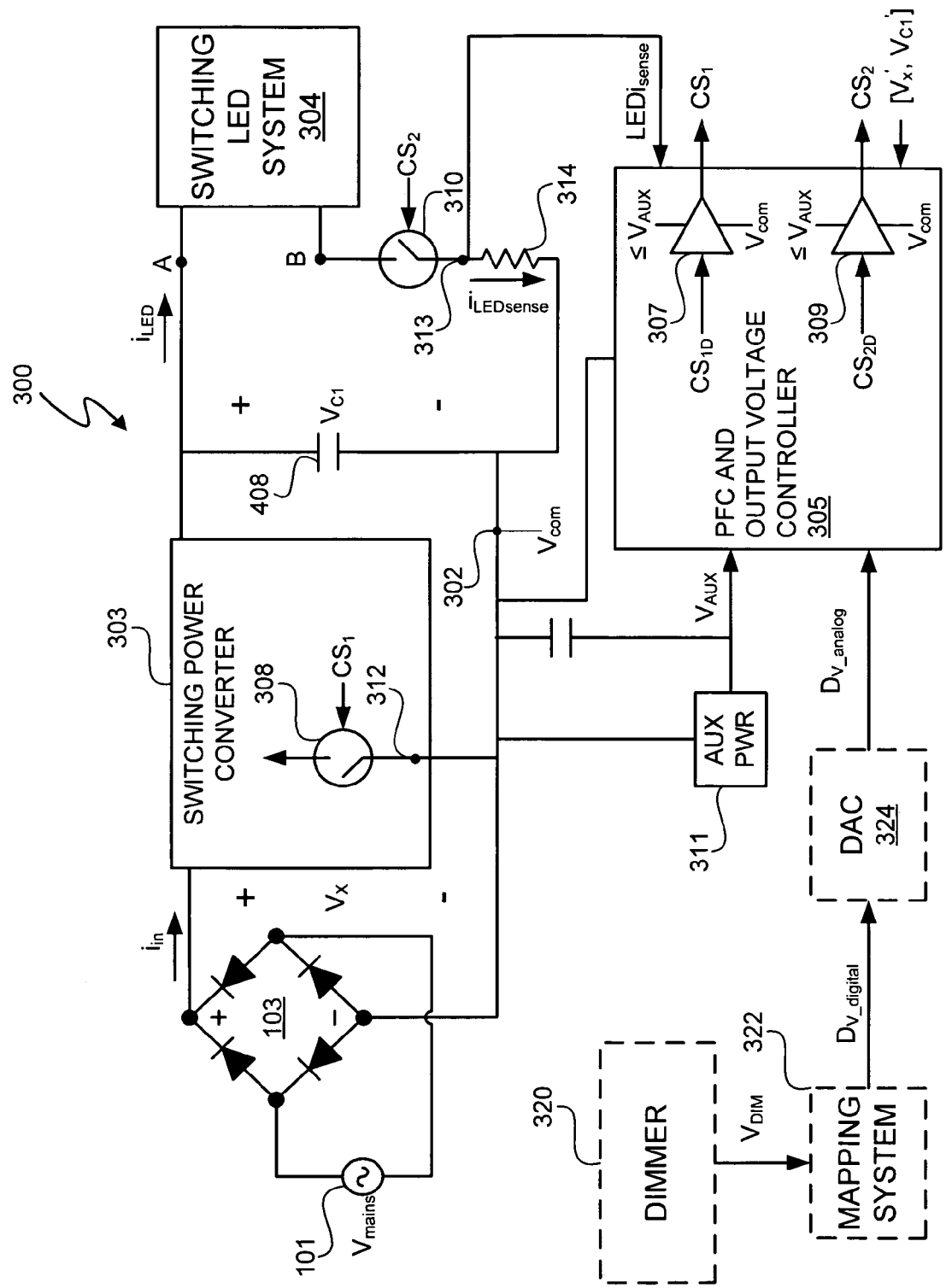
FIG. 3 depicts a LED lighting system that includes a common reference node at a common reference voltage.
Figure 4:
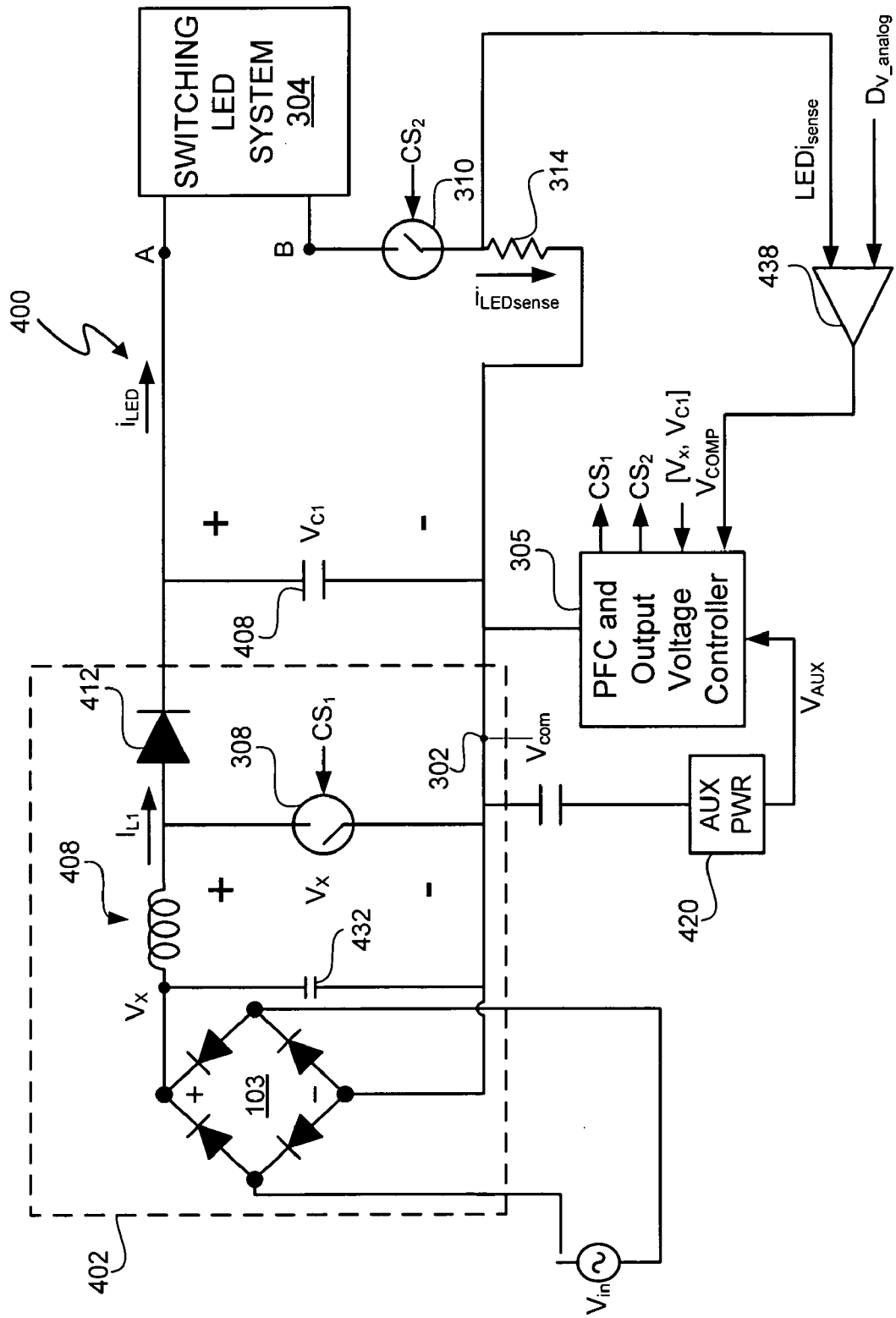
FIG. 4 depicts a LED lighting system.

In at least one embodiment, the controller 305 is manufactured in a 12-20 Volt ("V") complimentary metal oxide semiconductor (CMOS) integrated circuit process ("IC Process"), coupled to 200V-500V rated field effect transistors (FETs) external to the integrated circuit (IC) controller. This embodiment is a particularly cost-effective combination of technologies. In a further refinement of the preferred embodiment, the IC Process also includes 5V or lower transistors in the IC controller in addition to the 12V-20V transistors, allowing for dense digital designs. A digital controller, in 0.35 micron or finer process technology allows for a very small, cost effective, digital controller. A 12V-20V process allows for the appropriate driving of the gates of external high-voltage FETs. In at least one embodiment, the IC controller is controller 305 (FIGS. 3 and 4). The foregoing voltage limits typically indicate that the high voltage devices (which have approximately 12V of gate-source voltage to be fully turned on, and less than 1V to be fully turned off) have sources at nearly the same voltage potential, in order that the same controller can drive both.

An LED lighting system that includes dimming capability can be subject to rapid changes in power demand by a switching LED system load. The switching LED system includes one or more light emitting diodes (LED(s)). For example, if the LED(S) are operating at full intensity and a dimming level of 15% of full intensity is requested, the power demand of the switching LED system is quickly and significantly reduced. In at least one embodiment, the LED lighting system utilizes feedforward control to allow the controller to concurrently modify power demand by the LED lighting power system and power demand of one or more switching LED systems. Thus, in at least one embodiment, the LED lighting system can quickly respond to the lower power demand by reducing power received from a power source, such as a mains source, and use a compensator, such as a proportional integral (PI) type control, to make relatively small corrections to maintain a desired LED lighting system output voltage.

Additionally, in at least one embodiment, the LED lighting system includes multiple switching LED systems, and each switching LED system includes at least one LED. In at least one embodiment, the LED lighting system utilizes a common current sense device to provide a common feedback signal to the controller representing current in at least two of the switching LED systems. In at least one embodiment, utilizing a common current sense device reduces a number of pins of the controller used for feedback and reduces a number of current sense devices.

FIG. 3 depicts a LED lighting system 300 that includes a common reference node 302 at a common reference voltage $V_{com}$, such as a ground reference during normal operation. The LED lighting system 300 operates from two supply voltages, $V_X$ and $V_{AUX}$, which are both referenced to the common reference voltage. A third voltage, $V_D$ (shown in FIG. 15), can be generated internal to the controller 305 and is preferably in the range of 1.5V-5.0V, depending on the chosen CMOS technology. "Normal operation" refers to the operation of LED lighting system 300 after power has been supplied to the LED lighting system 300 and any initial voltage or current transients have subsided. The LED lighting system 300 generates a link voltage $V_{C1}$. The PFC switch 308 and LED drive current control switch 310 have absolute, control node-to-common node voltages within 15% of the difference between the absolute link voltage $V_{C1}$ minus the common reference voltage $V_{com}$, ie. $V_{C1}$-$V_{com}$. PFC and output voltage controller 305 (referred to as "controller 305") operates from an auxiliary supply voltage $V_{AUX}$. The absolute value of auxiliary supply voltage $V_{AUX}$ is less than the absolute value of the link voltage $V_{C1}$.

FIGS. 5A, 5B, 5C, and 5D depict exemplary embodiments of switch 530, which represents one embodiment of switches 308 and 310. Referring to FIG. 5A, the nodes of 532, 534, and 536 of generic switch 530 represent respective control, common, and switching nodes. FIGS. 5B, 5C, and 5D represent embodiments of switch 530. Referring to FIG. 5B, switch 540 is an n-channel MOSFET, and gate node 542, source node 544, and drain node 546 respectively represent a control node, a common node, and a switching node. Referring to FIG. 5C, switch 550 is a bipolar junction transistor (BJT), and base node 552, emitter node 554, and collector 556 respectively represent a control node, a common node, and a switching node. Referring to FIG. 5D, switch 560 is an insulated gate bipolar transistor (IGBT), and gate node 562, emitter node 564, and collector 566 respectively represent a control node, a common node, and a switching node.

FIG. 5E depicts an exemplary driver circuit 570, which represents one embodiment of drivers 307 and 309. The source of p-channel FET 572 and the drain of n-channel FET 574 are connected together and provide the output signal CSX where CSX represents control signals $CS_1$ and $CS_2$. The drain of p-channel FET 572 is connected to the high side supply rail voltage, which is less than or equal to auxiliary voltage $V_{AUX}$. The source of n-channel FET 574 is connected to the low side supply rail voltage $V_{com}$. FETs 572 and 574 share a gate node 576 to receive the control signal $CS_x$.

Figure 1:
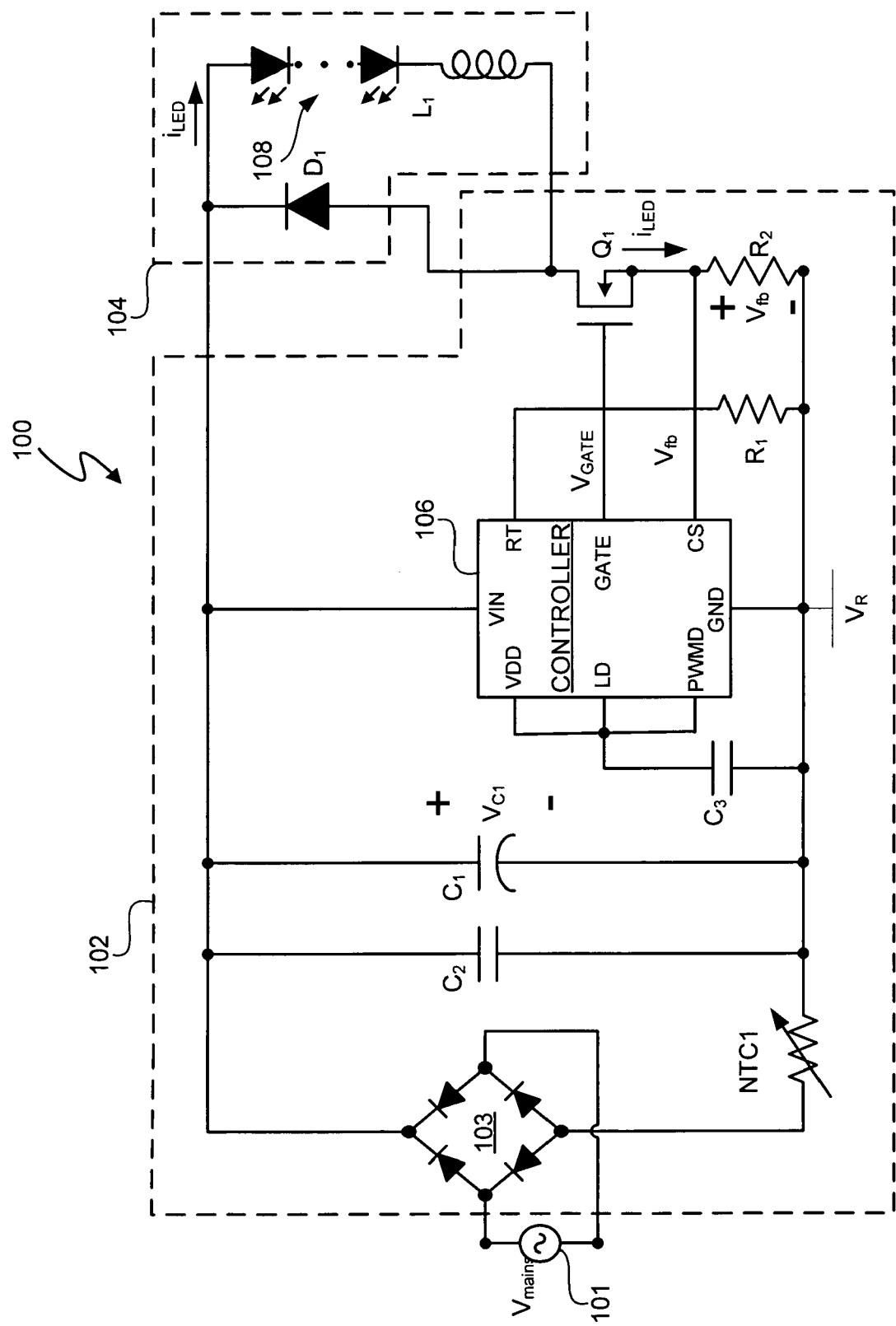
FIG. 1 (labeled prior art) depicts a switching light emitting diode (LED) driver system FIG. 2 (labeled prior art) depicts a power control system, which includes a switching power converter.
Figure 2:
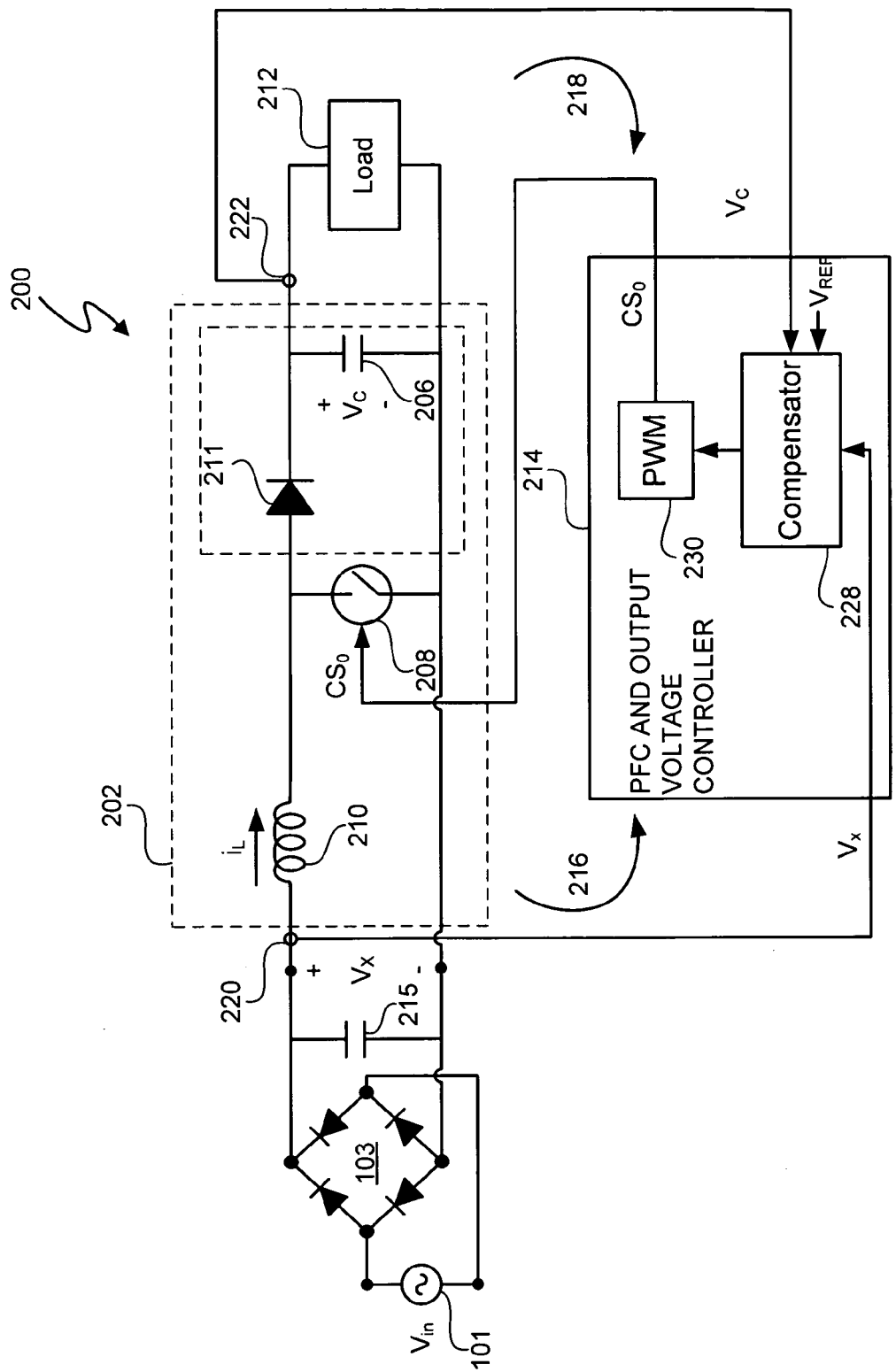

Referring to FIG. 3, diode rectifier 103 rectifies the input mains voltage $V_{mains}$ and supplies a rectified, time-varying, primary supply voltage $V_x$ to a switching power converter 303. In at least one embodiment, mains voltage $V_{mains}$ a mains voltage such as the mains voltage $V_{mains}$ in FIGS. 1 and 2. Referring to FIG. 3, the auxiliary power supply 311 provides low voltage power to the controller 305. Providing low voltage power to the controller 305 allows controller 305 to be manufactured at a lower cost than higher voltage controllers. Additionally, during normal operation of the LED lighting system, a power factor correction (PFC) switch and an LED drive current switch of the LED lighting system, that respectively control power factor correction and LED drive current, are coupled to the common reference node and have control node-to-common node, absolute voltage that allows the controller to control the conductivity of the switches. During normal operation, the switching power converter 303 converts the primary supply voltage $V_x$ into an output, link voltage $V_{C1}$. In at least one embodiment, by referencing controller 305 to the common reference node and establishing the control node-to-common node voltages of switches 308 and 310 within 15% of the voltage difference $V_{C1}$-$V_{com}$, controller 305 is able to control the conductivity of the switches 308 and 310 while operating from the auxiliary voltage $V_{AUX}$ of auxiliary power supply 311. In at least one embodiment, the voltages at current nodes 312 and 313 are within +1V of the common reference voltage $V_{com}$. A current sense resistor may or may not be required in the PFC switch 308, depending on the control mode chosen for the controller 305. In the preferred embodiment, controller 305 is a discontinuous current mode controller and does not use a current sense for controlling power factor correction.

The auxiliary power supply 311 supplies power to controller 305. The auxiliary power supply 311 provides a supply voltage $V_{AUX}$ less than, such as approximately from 1% to 15%, the absolute value of the link voltage $V_{C1}$. For example, in at least one embodiment, the nominal RMS primary supply voltage $V_x$ is 110V, and the supply voltage $V_{AUX}$ is any value within the range of +1V to +15V, such as +1V, +3V, +5V, +12V, or +15V. Because controller 305 is powered by a relatively small supply voltage, controller 305 can be manufactured less expensively than a controller manufactured for higher supply voltages. The voltage $V_{AUX}$ is chosen commensurate with the required drive voltage of the external switch. For an FET, this voltage is typically around 12V. For a bipolar transistor, current drive would often be used, and the voltage would be 1V-2V.

During normal operation, the switching power converter 303 converts the primary supply voltage $V_x$ into an output, link voltage $V_{C1}$. In at least one embodiment, switching power converter 303 is a boost converter, i.e. link voltage $V_{C1} > V_x$. For a particular dimming level, the switching power converter 303 provides an approximately constant current $i_{LED}$ to LED light source 308. The current $i_{LED}$ varies with dimming levels but, in at least one embodiment, is approximately constant for a particular dimming level. The switching power converter 303 includes switch 308 to control the input current $i_{in}$ so that the average input current $i_{in}$ is linearly and directly related to the primary supply voltage $V_x$, thereby making the switching power converter 303 appear resistive to voltage source 301. By controlling the input current $i_{in}$, switch 308 also controls the value of link voltage $V_{C1}$. During normal operation of the LED lighting system 300, the link voltage $V_{C1}$ has an approximately constant value over time and, thus, approximates a DC voltage. In at least one embodiment, the switching LED system 304 includes one or more individual LEDs or one or more parallel coupled strings of LED(s) as, for example, described in more detail with reference to FIGS. 5A and 5B. The link voltage $V_{C1}$ is typically in the range of 200V-500V, depending on the AC mains voltage $V_{mains}$.

Controller 305 generates PFC control signal $CS_1$ to control the conductivity of switch 308. Controller 305 includes a buffer 307 to provide the drive current for PFC control signal $CS_1$. Controller 305 generates a digital PFC control signal $CS_{1D}$ that is amplified by buffer 307 to generate PFC switch control signal $CS_1$. Buffer 307 operates from a high side voltage supply rail of less than or equal to auxiliary voltage $V_{AUX}$ and from a low side voltage supply rail of common voltage $V_{com}$. Controller 305 adjusts the pulse width of PFC control signal $CS_1$ to increase as the primary supply voltage $V_x$ increases and to decrease as primary supply voltage $V_x$ decreases to provide power factor correction. Controller 305 maintains a duty cycle of PFC control signal $CS_1$ while adjusting the pulse width of PFC control signal $CS_1$ to maintain an approximately constant link voltage $V_{C1}$. Controller 305 receives feedback signal $V_x'$ to detect the value of voltage $V_x$. Controller 305 also receives feedback signal $V_{C1}'$ to detect the value of voltage $V_{C1}$. Controller 305 uses the value of detected feedback signals $V_x'$ and $V_{C1}'$ to adjust PFC control signal $CS_1$ so that switching power converter 303 provides power factor correction and maintains an approximately constant link voltage $V_{C1}$.

The controller 305 can be implemented to generate the PFC control signal $CS_1$ in any of a variety of ways, such as the exemplary ways described in Melanson IV, Melanson V, and Melanson VII. The feedback signals $V_x'$ and $V_{C1}'$ can be generated in any of a variety of ways, such as the exemplary ways described in Melanson V, Melanson VI, and Melanson VIII.

Controller 305 generates an LED current control switch signal $CS_2$ to modulate the conductivity of LED drive current control switch 310. Controller 305 generates a digital LED current control signal $CS_{2D}$ that is amplified by buffer 309 to generate LED current control switch control signal $CS_2$. Controller 305 includes a buffer 309 to provide the drive current for LED current control switch signal $CS_2$. Buffer 309 operates from a high side voltage supply rail of less than or equal to auxiliary voltage $V_{AUX}$ and from a low side voltage supply rail of common voltage $V_{com}$. In at least one embodiment, LED current control switch signal $CS_2$ is a duty cycle modulated gate drive signal. The duty cycle modulated gate drive signal modulating the conductivity of switch 310 controls the LED current $i_{LED}$ supplied by switching power converter 303. The current $i_{LED}$ serves as the drive current for switching LED system 304. Adjusting the current $i_{LED}$ modifies the intensity of switching LED light system 304. The controller 305 modulates the conductivity of switch 310 so that an average LED current $i_{LED}$ causes each LED in the switching LED system 304 to illuminate at a desired intensity level. In a non-dimmed configuration of LED lighting system 300, the desired intensity level is, for example, the full (100%) rated intensity of the LED(s) of the switching LED system 304 or zero (0) intensity (off).

As subsequently described in more detail, to regulate the LED drive current $i_{LED}$, the controller 305 receives a LED feedback signal $LEDi_{sense}$ from a current sense device 314. In at least one embodiment, the feedback signal $LEDi_{sense}$ is the current $i_{LED}$ or a scaled version of the current $i_{LED}$. In another embodiment, the feedback signal $LEDi_{sense}$ is a voltage that is directly proportional to the current $i_{LED}$. The controller 305 responds to the feedback signal $LEDi_{sense}$ by modifying the current delivered to the switching LED system 304 to maintain a desired LED current $i_{LED}$ and desired link voltage $V_{C1}$. The current sense device 314 can be any device capable of sensing the LED current $i_{LED}$. In at least one embodiment, current sense device 314 is a resistor, and the feedback signal $LEDi_{sense}$ is a voltage sensed across the resistor. In at least one embodiment, the feedback signal $LEDi_{sense}$ is sensed by a magnetic current sensor in the proximity of current flowing through an inductor (such as inductor 606 of FIG. 6A or inductor 612 of FIG. 6B) in switching LED system 304. In at least one embodiment, current sense device 314 is a current mirror circuit. Current mirrors are generally not used in high voltage applications. Controller 305 can generate LED current control switch signal $CS_2$ in any of a variety of ways. Melanson III describes an exemplary system and method for generating LED current control switch signal $CS_2$.

In at least one embodiment, LED lighting system 300 can dim the LED(s) of switching LED system 304, i.e. adjust the intensity of the LED(s) of switching LED system 304, in response to a dimmer signal $D_V$. The dimmer signal $D_V$ can be a digital dimming signal $D_{V\_digital}$ or an analog dimming signal $D_{V\_analog}$ indicating a dimming level for switching LED system 304. Values of dimmer signal $D_V$ function as a target reference and are compared with $LEDi_{sense}$ external to controller 305 or an integral part of an integrated circuit version of controller 305. In at least one embodiment, the controller 305 adjusts LED current control switch signal $CS_2$ to minimize a difference between the comparison between the dimmer signal $D_V$ and the feedback signal $LEDi_{sense}$. In at least one embodiment, the dimmer signal $D_V$ is generated and detected as described in Melanson I and Melanson II.

In at least one embodiment, the dimmer signal $D_V$ represents a mapping of a conventional, duty cycle modified dimmer signal to predetermined values different than the dimming level represented by the dimmer output signal value. In at least one embodiment, a conventional dimmer 320 generates a dimming signal $V_{DIM}$. The dimming signal $V_{DIM}$ is, for example, a duty cycle modified (i.e. phase-cut) analog signal whose duty cycle or phase angle represents a dimming level. Mapping system 322 includes a lighting output function that converts the dimmer levels indicated by dimming signal $V_{DIM}$ to a digital dimming signal $D_{V\_digital}$ having values that map measured light levels to perception based light levels as described in conjunction with the exemplary systems and methods of Melanson I and Melanson II. In at least one embodiment, controller 305 uses the digital dimming signal $D_{V\_digital}$ directly to generate LED current control switch signal $CS_2$. In at least one embodiment, digital-to-analog converter (DAC) 324 converts the digital dimming signal $D_{V\_digital}$ into a corresponding analog dimming signal $D_{V\_analog}$. The digital and analog versions of dimming signal $D_V$ are generically referred to here as dimming signal $D_V$. Dimmer 320, mapping system 322, and DAC 324 are shown in "dashed lines" because dimming is optional for LED lighting system 300.

FIG. 4 depicts a LED lighting system 400, which represents one embodiment of LED lighting system 300. LED lighting system 400 includes switching power converter 402 to convert the rectified input voltage $V_x$ into an approximately DC link voltage $V_{C1}$. Switching power converter 402 and controller 305 also provide power factor correction. The switching power converter 402 includes a switch 308 that turns 'on' (conducts) and turns 'off' (nonconductive) in response to a PFC control signal $CS_1$ generated by PFC and output voltage controller 305. When switch 308 is 'on', inductor 408 energizes with the current $I_{L1}$ from the full-bridge diode rectifier 103. When switch 308 is 'off', the inductor 408 drives current $I_{L1}$ through diode 412 to charge capacitor 408. The PFC control signal $CS_1$ varies the duty cycle of switch 308 so that the DC voltage link voltage $V_{C1}$ on storage capacitor 408 averages to a desired value of DC voltage $V_{C1}$. In at least one embodiment, steady state voltage $V_{C1}$ has an average value in the range of 200 V to 400V. In at least one embodiment, current $I_{L1}$ represents current $i_{in}$ of FIG. 3. PFC and output voltage controller 305 operates as previously described to control the duty cycle of switch 308 such that current $I_{L1}$ is linearly proportional to the input voltage $V_x$. Capacitor 432 provides filtering to smooth inductor current $I_{L1}$ so that the average inductor current $I_{L1}$ is sinusoid in phase with input signal $V_x$.

Controller 305 generates LED current control switch signal $CS_2$ based on the value of the comparator 438 output signal $V_{comp}$. In at least one embodiment, comparator output signal $V_{comp}$ is a voltage representing a logical "1" if the value of feedback signal $LEDi_{sense}$ is greater than an analog value of dimmer signal $D_{V\_analog}$. Otherwise, the value of comparator output signal $V_{comp}$ is a logical "0". The dimmer signal $D_V$ is a target reference value, and controller 305 generates controls signal $CS_2$ to modify the current $i_{LED}$ to minimize differences between feedback signal $LEDi_{sense}$ and dimmer signal $D_{V\_analog}$. The dimmer signal $D_{V\_analog}$ is scaled so that when the difference between feedback signal $LEDi_{sense}$ and dimmer signal $D_V$ analog is minimized, the intensity of the LED(s) of switching LED system 304 matches the dimming level indicated by dimmer signal $D_V$ analog. As the dimming level indicated by dimmer signal $D_V$ analog changes, the value of comparator output signal $V_{comp}$ also changes so that controller 305 causes LED current control switch signal $CS_2$ to track the changes in dimming level indicated by dimmer signal $D_{V\_analog}$. As previously described, in at least one embodiment, controller 305 uses the comparator output signal $V_{comp}$ to generate LED current control switch signal $CS_2$ as described in Melanson III.

Figure 6B:
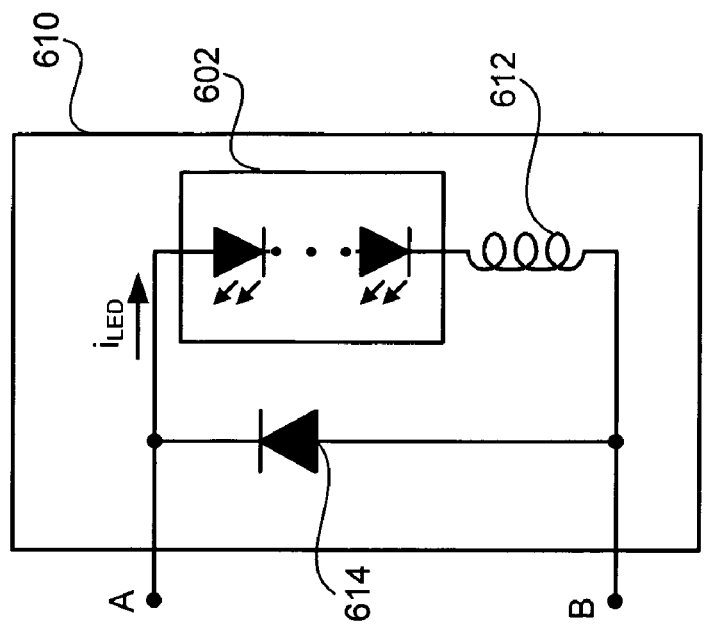
FIGS. 6A and 6B depict switching LED systems.
Figure 6A:
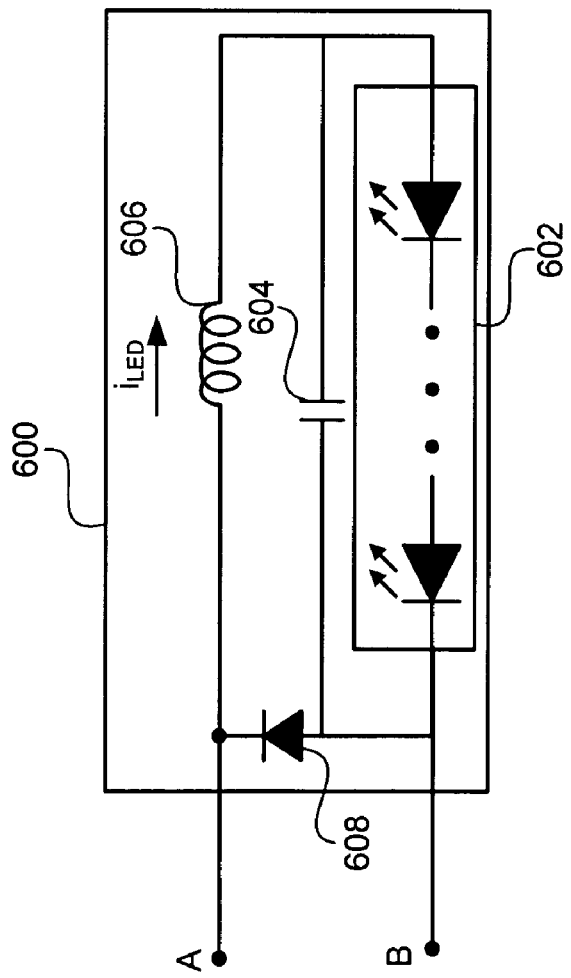

FIGS. 6A and 6B depict exemplary embodiments of switching LED system 304. Switching LED system 600 includes one or more LED(s) 602. The LED(s) 602 can be any type of LED including white, amber, other colors, or any combination of LED colors. Additionally, the LED(s) 602 can be configured into any type of physical arrangement, such as linearly, circular, spiral, or any other physical arrangement. In at least one embodiment, each of LED(s) 602 is serially connected. Capacitor 604 is connected in parallel with LED(s) 602 and provides filtering to protect the LED(s) 602 from AC signals. Inductor 606 smooths energy from LED current $i_{LED}$ to maintain an approximately constant current $i_{LED}$ when switch 310 conducts. Diode 608 allows continuing current flow when switch 310 opens.

In switching LED system 610, inductor 612 is connected in series with LED(s) 602 to provide energy storage and filtering. Inductor 612 smoothes energy from LED current $i_{LED}$ to maintain an approximately constant current $i_{LED}$ when switch 310 conducts. Diode 614 allows continuing current flow when switch 310 opens. Although two specific embodiments of switching LED system 304 have been described, switching LED system 304 can be any switching LED system.

Figure 7:
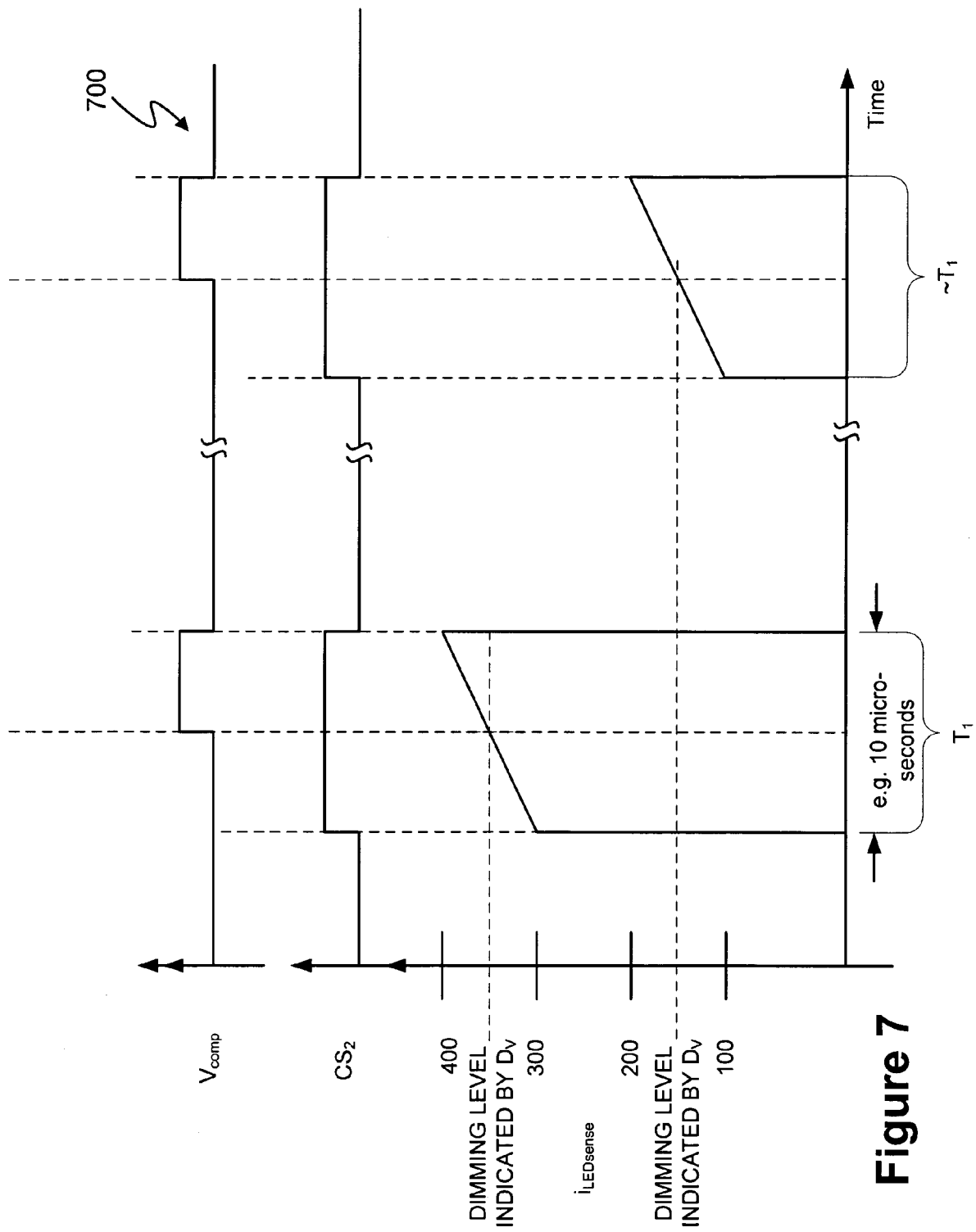
FIGS. 7-8 depict graphical relationships between various control signals, sense signals, and currents of the LED lighting system of FIG. 4.

FIG. 7 depicts a graphical relationship 700 between the comparator voltage $V_{COMP}$, LED current control switch signal $CS_2$, and current $i_{LEDsense}$ (FIG. 4). When LED current control switch signal $CS_2$ is high, switch 310 conducts, and LED current $i_{LED}$ increases. When the comparator voltage $V_{COMP}$ goes high, PFC and output voltage controller 305 keeps LED current control switch signal $CS_2$ high until the comparator voltage $V_{COMP}$ goes low again. In this manner, the average current $i_{LEDsense}$, and, thus, the average LED current $i_{LED}$, is responsive to the dimmer signal $Dv$, and, thus, the intensity of the LED(s) in switching LED system are also responsive to dimmer signal $Dv$.

Figure 8:
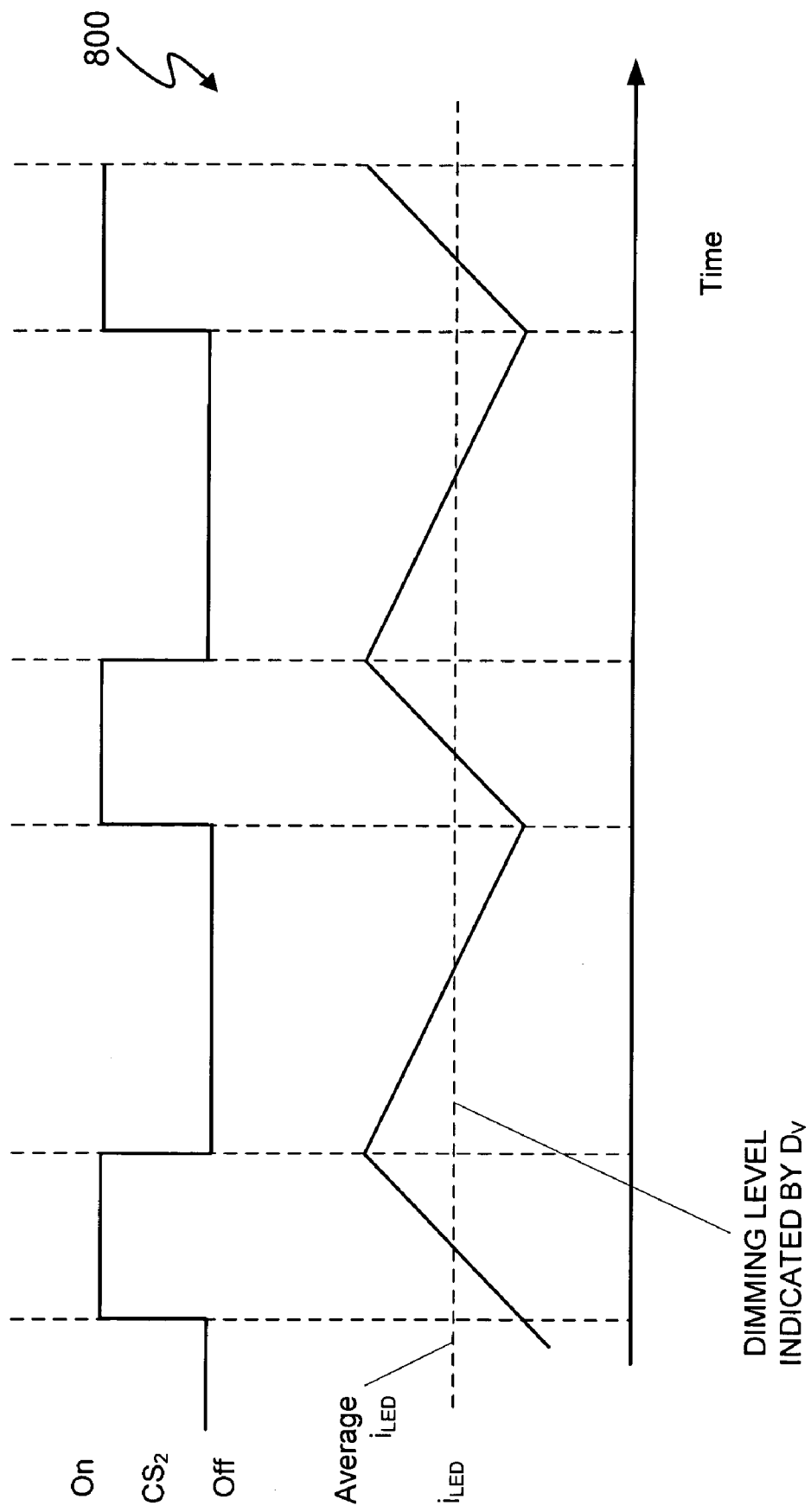

FIG. 8 depicts a graphical relationship 800 between LED current control switch signal $CS_2$ and current $i_{LED}$. The LED current $i_{LED}$ ramps up when LED current control switch signal $CS_2$ is high (i.e. causes switch 310 to conduct) and ramps down when LED current control switch signal $CS_2$ is low (i.e. causes switch 310 to turn 'off'). The average current $i_{LED}$ tracks the dimmer signal $Dv$. The intensity of switching LED system 304 is approximately directly proportional to the driving LED current $i_{LED}$.

Figure 9:
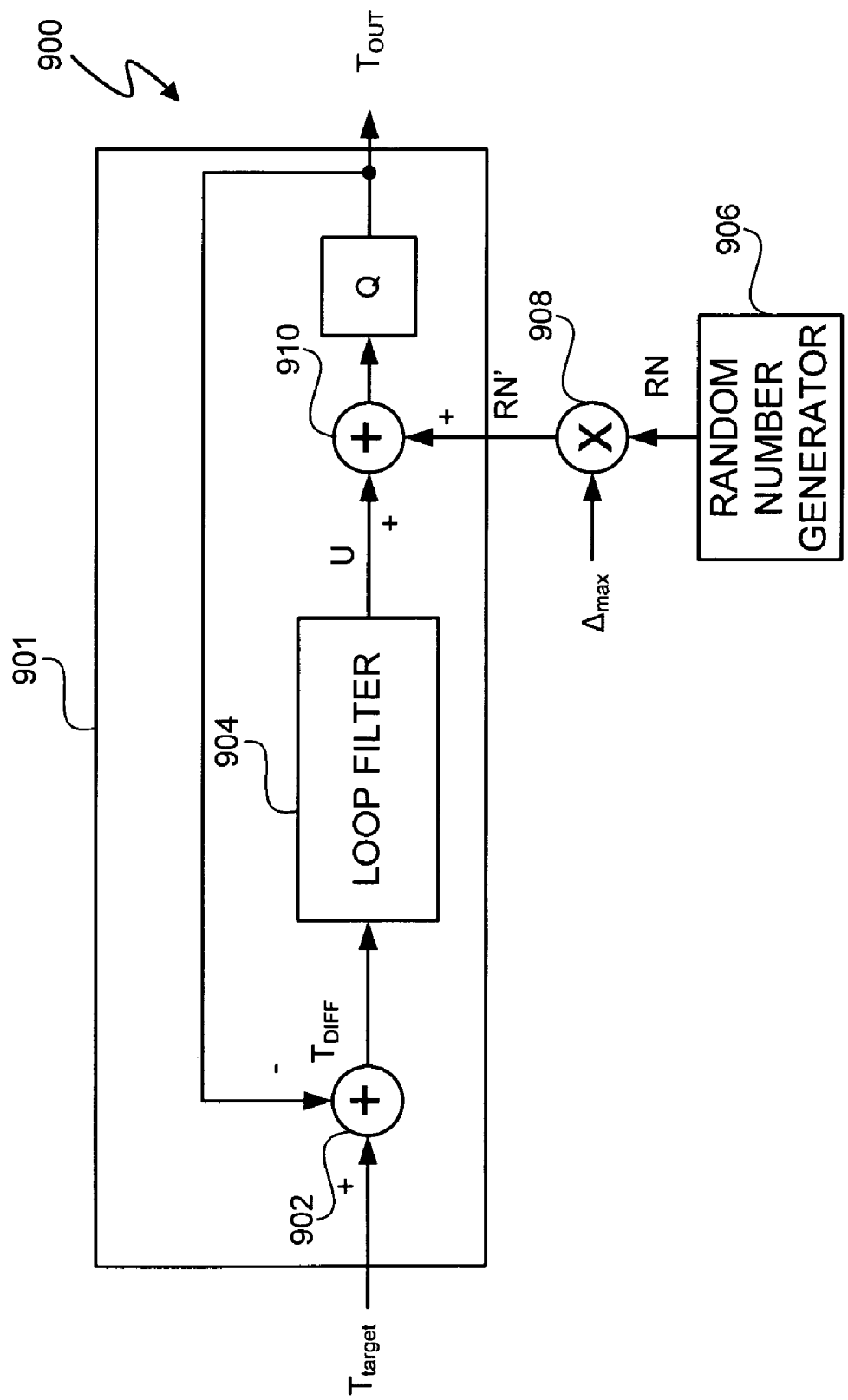
FIG. 9 depicts a spread spectrum system.

FIG. 9 depicts one embodiment of a spread spectrum system 900. The spread spectrum system can be included as part of controller 305 or can be constructed using separate discrete components as a separate IC. Spread spectrum system 900 can also be implemented as code stored in a computer readable medium and executable by controller 405. In general, spread spectrum system 900 receives an input signal $T_{Target}$ and generates an output signal $T_{OUT}$. Output signal $T_{OUT}$ randomly varies from input signal $T_{Target}$ within a predetermined range set by $\Delta_{max}$, and an average value of output signal $T_{OUT}$ equals input signal $T_{Target}$. Input signal $T_{Target}$ is, for example, a pulse width of control signals $CS_1$ and/or $CS_2$. The value of $\Delta_{max}$ is, for example, +/−10% of a nominal value of PFC control signal $CS_1$. Multiple spread spectrum system 900 can be used by controller 305 to spread the spectrum of multiple input signals such as the pulse widths of control signals $CS_1$ and $CS_2$.

Spread spectrum system 900 includes a delta-sigma modulator 901. Delta-sigma modulator 901 includes an adder 902 that adds the current value of input signal $T_{Target}$ to a negative value of the previous value of output signal $T_{OUT}$ to generate a difference signal $T_{Diff}$. In at least one embodiment, spread spectrum system 900 is initialized as startup with output signal $T_{OUT}$=0. The difference signal $T_{Diff}$ is processed by loop filter 904 to generate a loop filter output signal U.

The values of delta-sigma modulator output signal $T_{OUT}$ are randomized around the values of input signal $T_{Target}$. A random number generator 906 generates random output values of random signal RN that are multiplied by $\Delta_{max}$ to generate random signal RN'. During each cycle of spread spectrum system 900, adder 910 adds the random signal RN' to the loop filter output signal U, and quantizer 912 quantizes the sum of RN' and U to generate the quantization output signal $T_{OUT}$. Random Number Generator 906 has predetermined value ranges set by a range limiting value $\Delta_{max}$. In at least one embodiment, RN' varies approximately 10%.

Delta-sigma modulator 901 can be any delta-sigma modulator such as any first order or multi-order delta-sigma modulator described in, for example, *Understanding Delta-Sigma Data Converters* by Schreier and Temes, IEEE Press, 2005, ISBN 0-471-46585-2 or as available from Cirrus Logic Inc. of Austin, Tex., U.S.A. The delta-sigma modulator 901 provides noise-shaping and seeks to consistently generate values of delta-sigma output signal $T_{OUT}$ that minimize the difference between output signal $T_{OUT}$ and difference signal $T_{Diff}$. Thus, delta-sigma modulator 901 helps ensure that the average output signal $T_{OUT}$ equals the average input signal $T_{Target}$.

Figure 10:
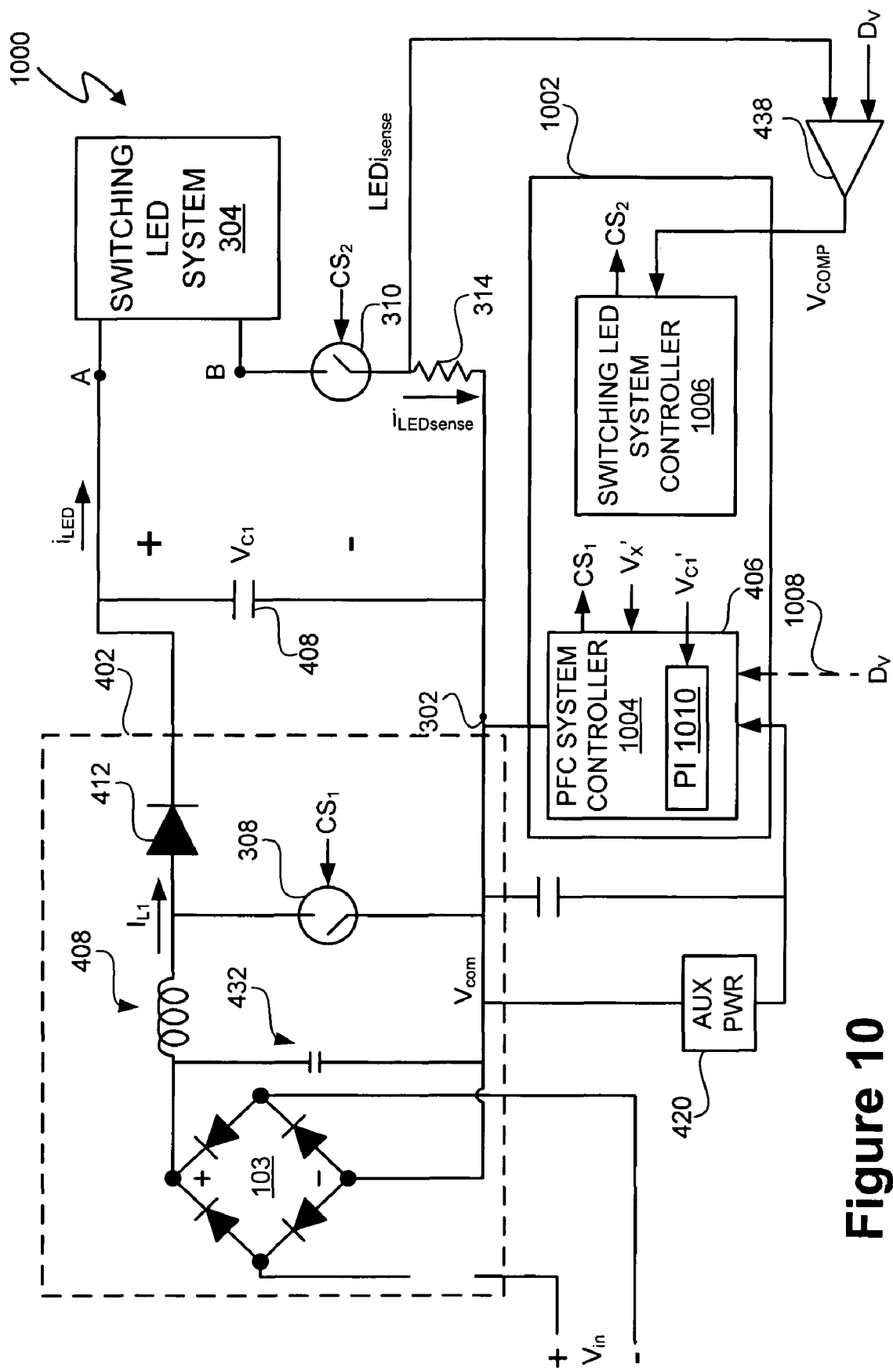
FIG. 10 depicts one embodiment of a feed forward lighting power and control system.

FIG. 10 depicts one embodiment of a feed forward lighting power and control system 1000. Power and control system 1000 preferably also includes a common reference node for switches 308 and 310 (through current sense device 314) and controller 1002. Controller 1002 represents one embodiment of controller 305. Controller 1002 is logically divided into two separate control systems, PFC control system 1004 to control power factor correction and regulate the link voltage $V_{C1}$ of switching power converter 402, and switching LED system controller 1006 to control the LED current $i_{LED}$ and, thus, control the intensity (i.e. brightness) of switching LED system 304.

The power and control system 1000 utilizes feed forward control so that PFC controller 1004 can more rapidly respond to changing power demands of Switching LED system light source 304 due to dimming. When dimmer signal Dv indicates a change in the dimming level of light source 304, switching LED system controller 1006 responds to dimming signal Dv by decreasing the pulse width of duty cycle modulated LED current control switch signal $CS_2$ to reduce the average values of current $i_{LED}$. Decreasing current $i_{LED}$ reduces the power demand of light source 304.

Feed forward control allows PFC system controller 1004 to anticipate power demand changes of light source 304 due to, for example, dimming. The PFC system controller 1004 is configured to provide a specific output voltage link voltage $V_{C1}$ for a specific dimming level. In at least one embodiment, the controller 1004 responds to comparison signal $V_{comp}$, which indicates a change in requested dimming level and, thus, a change in power demand by light source 304 by proportionately changing the pulse width of LED current control switch signal $CS_2$. In at least one embodiment, the dimmer signal Dv is provided directly to controller 1004 as shown by the dashed line 1008. However, providing dimmer signal Dv to controller 1004 may require an extra pin for controller 1002, which generally adds cost to controller 1002. Using feed forward control, the controller 1002 can concurrently modify power demand by the power factor correction control system 1004 and modify power supplied by the switching LED system controller 1006. The term "concurrently" includes short delays due to, for example, processing by controller 1006.

In accordance with changes in a dimming level indicated by the dimmer signal Dv, in at least one embodiment, the PFC system controller 1004 includes a proportional integrator (PI) compensator 1010 that receives a feedback signal link voltage $V_{C1}$ representing the link voltage $V_{C1}$ and generates an output signal using a PI transfer function, such as the PI transfer function and system of Melanson IV. However, because the dimmer signal $D_V$ anticipates power demand by light source 304, the PFC controller 1004 can concurrently respond to dimming level changes and, the PI compensator 1010, in at least one embodiment, only makes power demand adjustments of, for example, 10% of the total power delivered by the power and control system 1000. Responding more rapidly to power demand changes in light source 304 allows switching power converter 402 to utilize a smaller capacitor value, such as 4.7 µF for capacitor 408 because increases of link voltage $V_{C1}$ are reduced to within the operating characteristics of ceramic, polypropylene, and other capacitors that have advantageous properties relative to electrolytic capacitors such as better temperature characteristics because light source 304 tends to generate higher temperatures better suited for ceramic, polypropylene, and other higher temperature capacitors. In at least one embodiment, controller 1004 generates PFC control signal $CS_1$ in the same manner as controller 305 so that the changes in the dimming level indicated by dimmer signal $D_V$ are commensurate with changes to the power ($V_{C1} \cdot i_{in}$) delivered by switching power converter 402 while maintaining an approximately constant link voltage $V_{C1}$.

Figure 11:
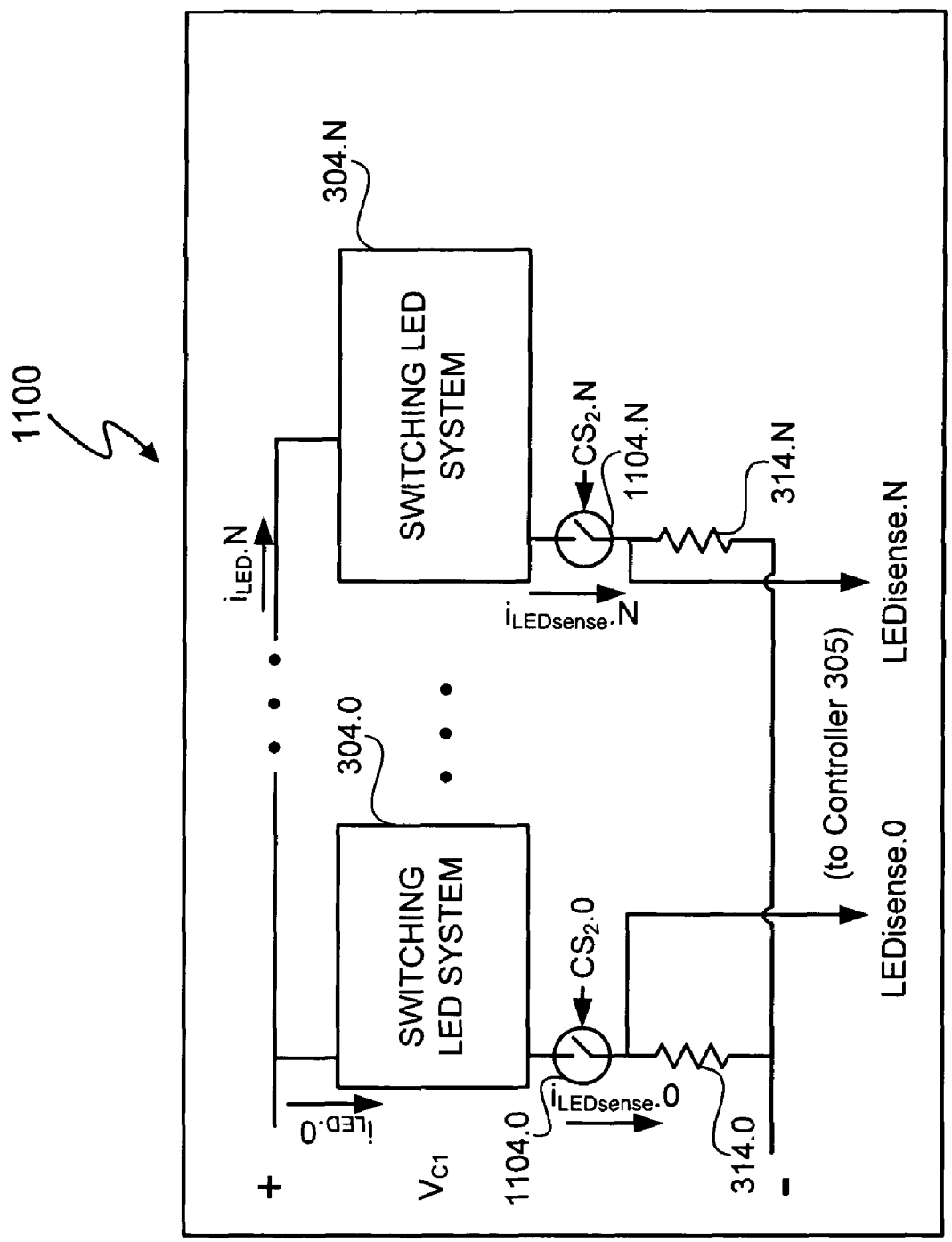
FIG. 11 depicts a switching LED system with multiple current sense elements.

FIG. 11 depicts a switching light source bank 1100 having N+1 switching LED systems, where N is an integer greater than or equal to 1. Switching LED system bank 1100 is a substitution for switching LED system 304. In at least one embodiment, each light source 304.x is a light source such as switching LED system 304, where x denotes the $x^{th}$ light source and is, for example, an integer and a member of the set {0, . . . , N}. Each of the N+1 light sources includes at least one LED and the number and color of each LED for each light source is a matter of design choice. Each light source 304.x is connected to a respective switch 1104.x, and each switch 1104.x is an n-channel FET. In at least one embodiment, controller 305 independently controls each light source 304.x by generating respective control signals $CS_2.0$, . . . , $CS_2.N$ to control the conductivity of switches 1104.0, . . . , 1104N. The average values of the drive currents $i_{LED}.0$, . . . , $i_{LED}.N$ control the respective intensity of LED(s) of switching LED systems 304.0, . . . , 304.N. Switching LED systems 304.0, . . . , 304.N are connected to respective current sense elements 314.0, . . . , 314.N.

The current sense elements 314.0, . . . , 314.N can be different or identical. Each current sense element 314.x provides a feedback signal LEDsense.x to controller 305. In at least one embodiment, controller 305 generates each control signal $CS_{2x}$ in the same manner as the generation of LED current control switch signal $CS_2$ (FIG. 4). The output signals of $LEDi_{sense}.0$, . . . , $LEDi_{sense}.N$ are fed back to controller 305 to allow controller 305 to adjust the switching frequency of switches 1104.0, . . . , 1104.N and, thus, correlate LED drive currents $i_{LED}.0$, . . . , $i_{LED}.N$ with a desired intensity of the LED(s) of light sources 304.0, . . . , 304.N. In at least one embodiment, the desired intensity is a dimming level indicated by dimmer signal $D_V$. The type, number, and arrangement of LED(s) in switching LED systems 304.0, . . . , 304.N is a matter of design choice and depends, for example, on the range of desired intensity and color temperatures of switching LED systems 304.0, ..., 304.N.

Figure 12:
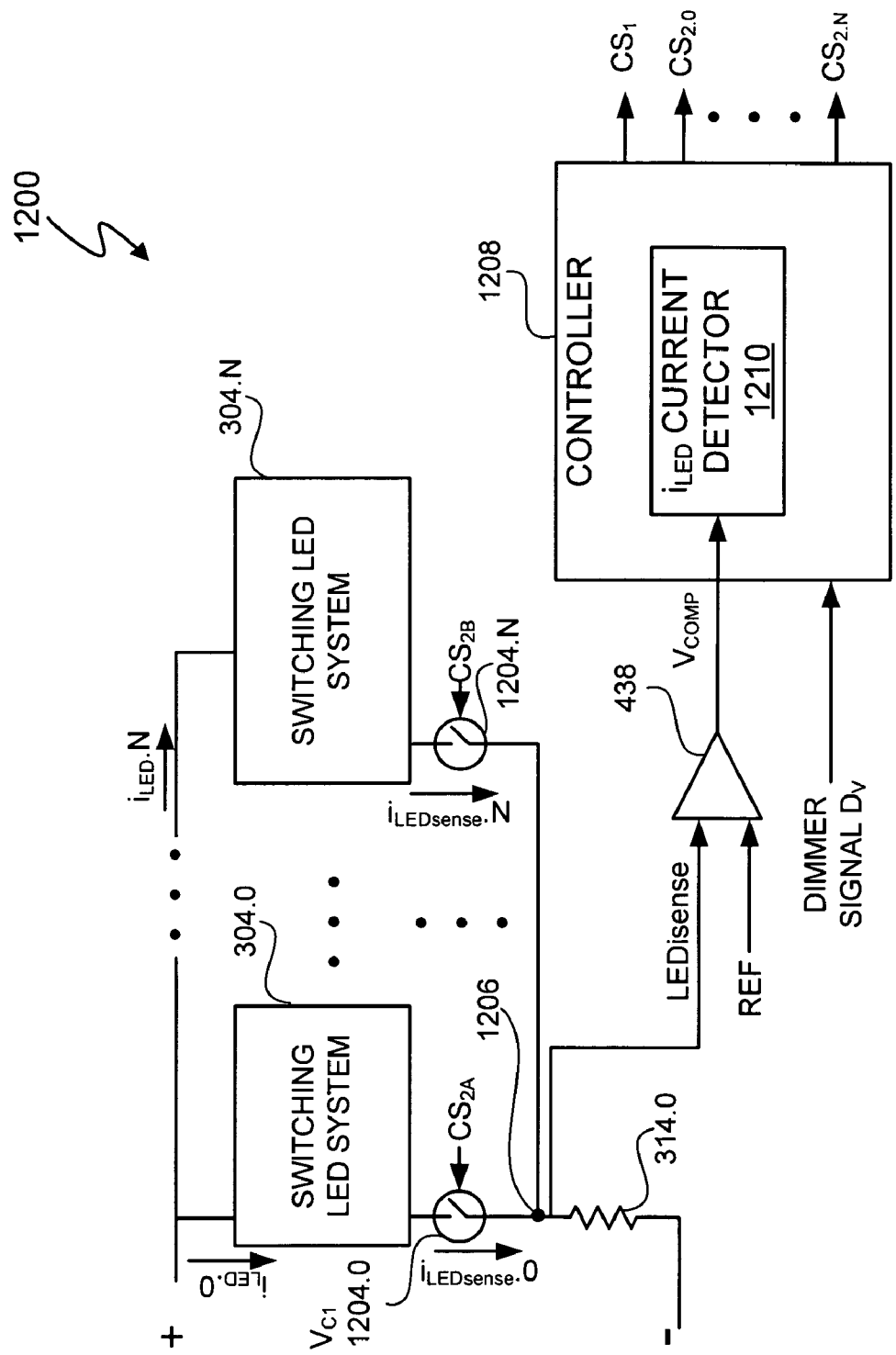
FIG. 12 depicts a switching LED system with a single current sense element.

FIG. 12 depicts a switching LED system bank 1200, which represents a substitution for switching LED system 304 (FIG. 4). One current sense element 312 provides a feedback signal LEDi$_{sense}$ that represents the LED sense currents of all switching LED systems 304.0, ..., 304.N to sense each of the LED sense currents i$_{LEDsense}$.0, ..., i$_{LEDsense}$.N for respective switching LED systems 304.0, ..., 304.N. Each of the switches 1204.0, ..., 1204.N have a common current node 1206. At the common current node 1206, all of the LED sense currents i$_{LEDsense}$.0, ..., i$_{LEDsense}$.N are combined, and the feedback signal LEDi$_{sense}$ from current sense device 312 represents the combination of all of the LED sense currents i$_{LEDsense}$.0, ..., i$_{LEDsense}$.N. In at least one embodiment, feedback signal LEDi$_{sense}$=1/x·(i$_{LEDsense}$.0+i$_{LEDsense}$.1+, ..., +i$_{LEDsense}$.N), where "x" is a scaling factor of current sense device 312. Utilizing a common sense element 312 reduces a number of pins for an integrated circuit implementation of controller 1208, which reduces the cost of controller 1208. Controller 1208 represents one embodiment of controller 305.

Figure 13:
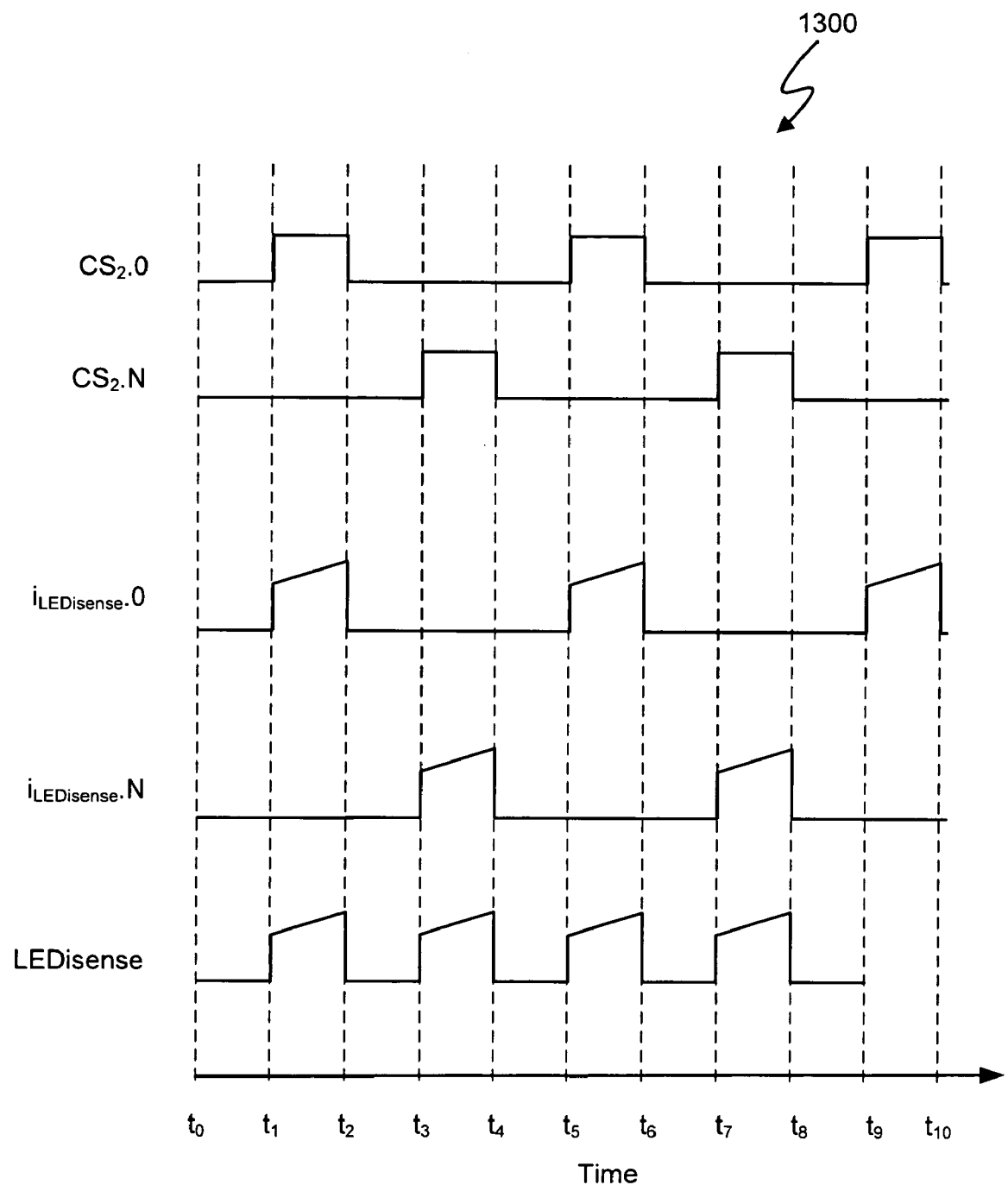
FIG. 13 depicts a graphical representation of non-overlapping control signals and current sense signals.

FIG. 13 depicts a graphical representation 1300 of non-overlapping control signals and current sense signals. The operation of LED source bank 1200 and controller 1208 (FIG. 12) are described in conduction with the signals of FIG. 13. Control signals CS$_2$.0 and CS$_2$.N represent two exemplary control signals for control signals CS$_2$.0, ..., CS$_2$.N. Control signals CS$_2$.0 and CS$_2$.N are depicted with a duty cycle of 0.25, i.e. pulse width/period, and non-overlapping pulse widths. During each pulse of control signals CS$_2$.0 and CS$_2$.N, respective currents i$_{LEDsense}$.0 and i$_{LEDsense}$.N flow through respective switches 1204.0 and 1204.N and are combined into the single LEDi$_{sense}$ feedback signal from current sense device 312.

Referring to FIGS. 12 and 13, controller 1208 includes an LED current detector 1210 that detects and determines the individual LED currents i$_{LED}$ in switching LED systems 304.0, ..., 304.N from the LEDi$_{sense}$ feedback signal. The location in time of each contribution of currents i$_{LEDsense}$.0 and i$_{LEDsense}$.N in the feedback signal LEDi$_{sense}$ corresponds to the respective pulses of controls signals CS$_2$.0 and CS$_2$.N.

In at least one embodiment, in a dimmable configuration, dimmer signal D$_V$ is used to indicate a dimming level for switching LED systems 304.0, ..., 304.N. Comparator 438 compares the LEDi$_{sense}$ feedback signal to the dimmer signal D$_V$. Variations in the comparator output signal Vcomp occur at approximately the same time as the contribution of currents i$_{LEDsense}$.0 and i$_{LEDsense}$.N to the feedback signal LEDi$_{sense}$. Since controller 1208 generates control signals CS$_2$.0 and CS$_2$.N, the times at which currents i$_{LEDsense}$.0 and i$_{LEDsense}$.N will vary the comparator output signal V$_{comp}$ are also known by LED current detector 1210. By knowing which changes in comparator output signal V$_{comp}$ correspond to each particular current of switching LED systems 304.0, ..., 304.N, controller 1208 can adjust each LED current control switch signal CS$_2$.0 and CS$_2$.N in response to the dimmer signal D$_V$ to dim the LEDs of switching LED systems 304.0 and 304.N to the dimming level indicated by dimmer signal D$_V$. In at least one embodiment, controller 1208 generates each LED current control switch signal CS$_2$.0, ..., CS$_2$.N in any manner described in conjunction with controller 305.

In at least one embodiment, the switching LED systems 304.0, ..., 304.N are not dimmed. In this embodiment, LED current detector 1210 receives the feedback signal LEDi$_{sense}$ directly. Since controller 1208 generates control signals CS$_2$.0 and CS$_2$.N, the times at which currents i$_{LEDsense}$.0 and i$_{LEDsense}$.N, LED current detector 1210 detects the contribution of currents i$_{LEDsense}$.0 and i$_{LEDsense}$.N during any of the respective times during which respective control signals CS$_2$.0 and CS$_2$.N are non-overlapping.

Figure 14:
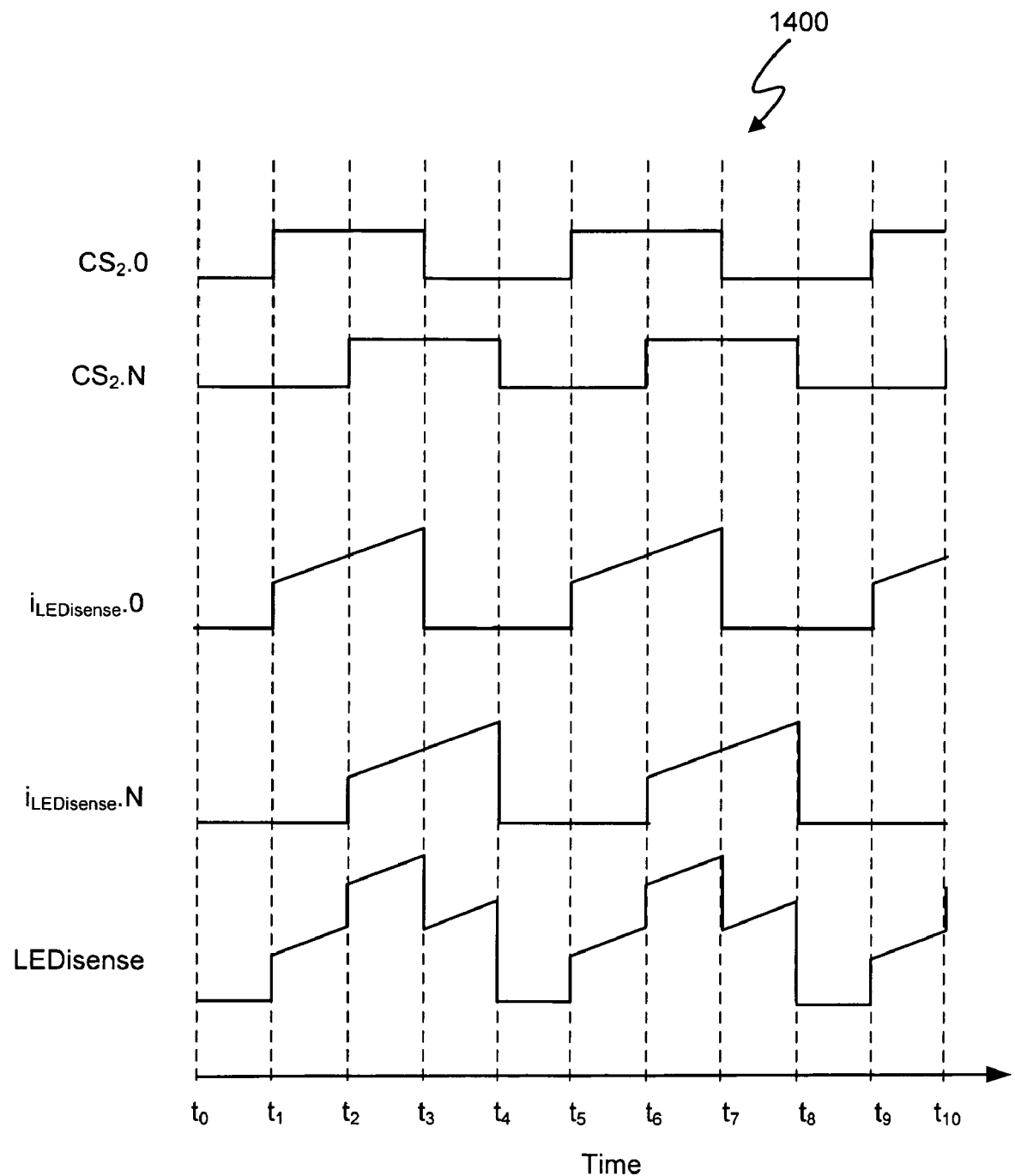
FIG. 14 depicts a graphical representation of overlapping control signals and current sense signals.

FIG. 14 depicts a graphical representation 1400 of overlapping control signals and current sense signals for processing by controller 1208 to generate multiple control signals for multiple light sources from a single feedback signal LEDi$_{sense}$. The overlapping control signals each have a duty cycle of 0.5. LED current detector 1210 detects the contributions of currents i$_{LEDsense}$.0 and i$_{LEDsense}$.N in feedback signal LEDi$_{sense}$ or comparator output signal V$_{comp}$ at times when the control signals CS$_2$.0 and CS$_2$.N are non-overlapping. For example, LED current detector 1210 detects the contribution of i$_{LEDsense}$.0 during times t$_1$ to t$_2$, t$_5$ to t$_6$, t$_9$ to t$_{10}$, and so on. Likewise, LED current detector detects the contribution of i$_{LEDsense}$.N during times t$_3$ to t$_4$, t$_7$ to t$_8$, and so on.

Figure 15:
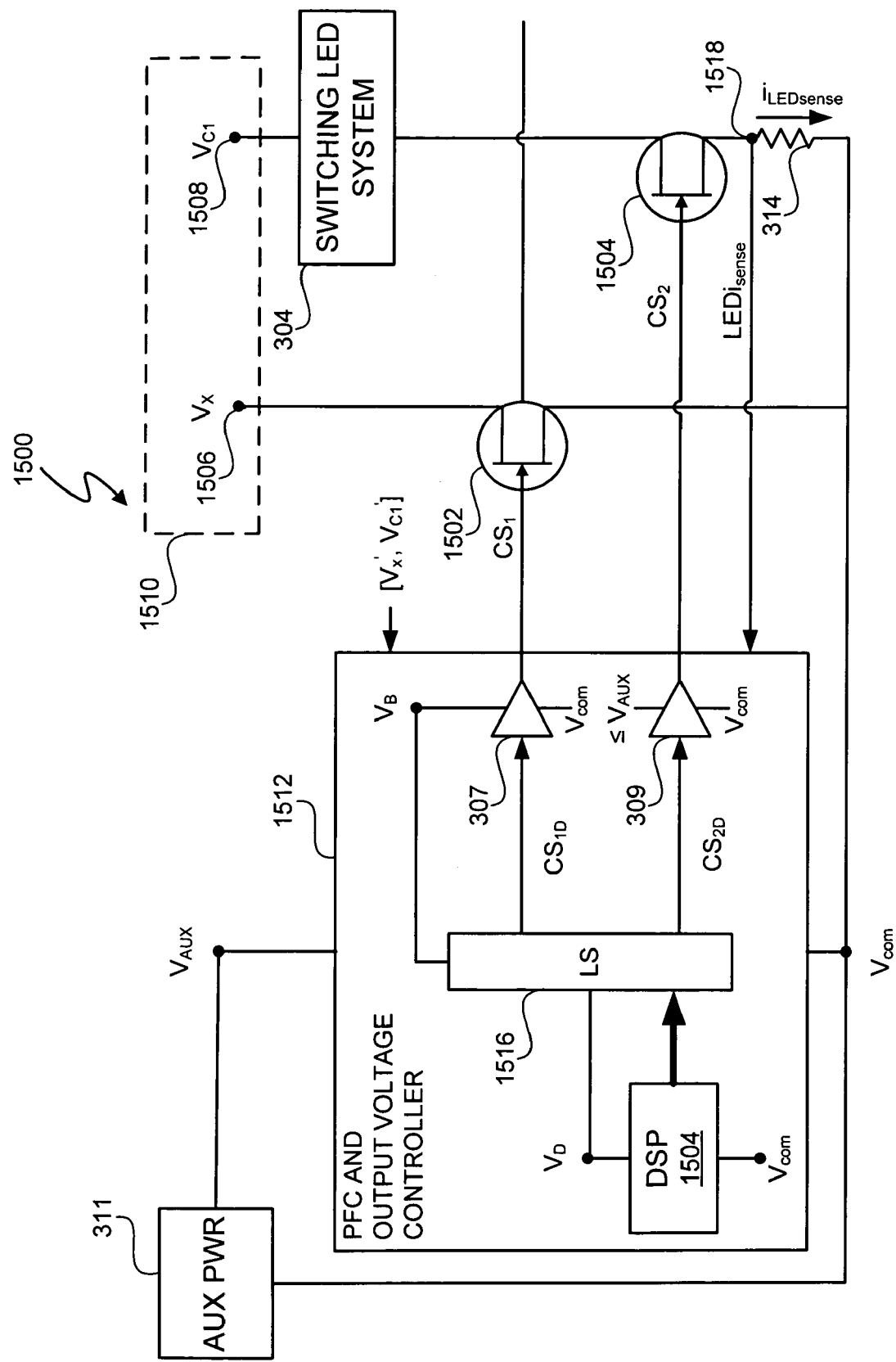
FIG. 15 depicts an embodiment of a controller of the lighting system of FIG. 3.

FIG. 15 depicts lighting system 1500, which is one embodiment of lighting system 300. Lighting system 1500 includes PFC switch 1502, which is an n-channel FET and represents one embodiment of switch 308. PFC switch 1502 operates between the primary supply voltage V$_x$ and the common reference voltage V$_{com}$. PFC switch 1502 does not have to be connected directly to the primary supply voltage V$_x$. In at least one embodiment, PFC switch 1502 is coupled through other components (not shown) to a primary supply voltage node 1506 conducting primary supply voltage V$_x$. Lighting system 1500 also includes LED drive current control switch 1504, which is an n-channel FET and represents one embodiment of switch 310. LED drive current control switch 1504 is coupled through switching LED system 304 to link voltage node 1508. LED drive current control switch 1504 operates between the link voltage V$_x$ and the common reference voltage V$_{com}$. Voltages V$_x$ and V$_{C1}$ are both switching power converter voltages and are collectively referred to as "high" supply voltages 1510 because they represent the highest voltages in the lighting system 1500. Nodes 1506 and 1508 are referred to as high voltage source nodes. PFC switch 1502 is, thus, referred to as a high voltage PFC switch, and LED current control switch 1504 is, thus, referred to as a high voltage LED current control switch. In at least one embodiment, the root mean square (RMS) of high supply voltages 1510 is greater than or equal to 100 V.

The lighting system 1500 also includes PFC and output voltage controller 1512, which in at least one embodiment is identical to controller 305. PFC and output voltage controller 1512 operates from at least two different voltages, which are lower than the high voltages 1510. Output buffers 307 and 309 operate between voltages V$_B$ and the common reference voltage. Voltage V$_B$ is less than or equal to auxiliary voltage V$_{AUX}$ and greater than or equal the digital voltage reference V$_D$. The voltage V$_B$ is set to be sufficient to drive the gates of switches 1502 and 1504 and, thus, control the conductivity of switches 1502 and 1504. Voltage V$_B$ is referred to as a "medium level" supply voltage. In at least one embodiment, the medium level supply voltage is in the range of 8 V to 50 V.

The lighting system 1500 also includes a digital signal processor (DSP) 1514 to generate PFC control signal CS$_{1D}$ and LED current control signal CS$_{2D}$. The DSP 1514 is coupled to an LED feedback node 1518. DSP 1514 operates between a digital supply voltage V$_D$ and the common reference voltage V$_{com}$. The digital supply voltage V$_D$ is sufficient to operate the digital components of DSP 1504 and is, for example, in the range of 3 V to 8 V. A level shifter (LS) 1516 level shifts the digital PFC control signal CS$_{1D}$ and digital LED current control signal CS$_{2D}$ from DSP 1504 to a level sufficient to control the conductivity of respective buffers 307 and 309. The digital supply voltage $V_D$ can be a stepped down version of the auxiliary voltage $V_{AUX}$ generated internally by controller 1512.

Thus, although the controller 1512 operates from a digital voltage $V_D$, and an auxiliary voltage $V_{AUX}$ and the switches operates from high voltages 1510, the lighting system 1500 has a common reference voltage $V_{com}$ to allow all the components of lighting system 1500 to work together. By operating from auxiliary voltage $V_{AUX}$, the controller 1512 can be fabricated using lower cost fabrication techniques than a controller operating from the high voltages 1510.

Thus, in at least one embodiment, a LED lighting system controller operates from a supply voltage $V_{AUX}$ less than a link voltage $V_{C1}$ generated by the LED lighting power system relative to a common reference voltage at a common reference node. By utilizing a lower voltage, in at least one embodiment, the controller can be manufactured at a lower cost than a comparable controller supplied by the primary power supply utilized by the LED lighting power system. Additionally, during normal operation of the LED lighting system, a power factor correction (PFC) switch and an LED drive current switch of the LED lighting system, that respectively control power factor correction and LED drive current, are coupled to the common reference node and have control node-to-common node, absolute voltage that allows the controller to control the conductivity of the switches. In at least one embodiment, the PFC switch and the LED drive current switch each have a control node-to-common node, absolute voltage within 15% of an absolute value of the link voltage relative to the common reference voltage. In at least one embodiment, the LED lighting system utilizes feed forward control to concurrently modify power demand by the LED lighting power system and power demand of one or more switching LED systems. In at least one embodiment, the LED lighting system utilizes a common current sense device to provide a common feedback signal to the controller representing current in at least two of the switching LED systems.

Although the present invention has been described in detail, it should be understood that various changes, substitutions and alterations can be made hereto without departing from the spirit and scope of the invention as defined by the appended claims.

What is claimed is:

1. A light emitting diode (LED) lighting system comprising:
   a power factor correction (PFC) and LED drive controller, the controller comprising:
      a digital signal processor, coupled to the LED feedback node and configured to:
         operate from a digital level supply voltage;
         generate a PFC control signal; and
         generate an LED current control signal;
      a first buffer, coupled to the processor, and configured to:
         operate from a medium level supply voltage, wherein the medium level supply voltage is greater than the digital level supply voltage;
         receive the PFC control signal; and
         convert the PFC control signal into a PFC switch control signal to control conductivity of a high voltage PFC switch; and
      a second buffer, coupled to the processor, and configured to:
         operate from the medium level supply voltage;
         receive the LED current control signal; and
         convert the LED current control signal into an LED current control switch signal to control conductivity of a high voltage LED current control switch.

2. The lighting system of claim 1 wherein the controller further comprises:
   an LED feedback node to receive an LED current feedback signal representing one or more current levels in one or more switching LED systems; and
   a voltage feedback node to receive an input voltage feedback signal representing an input voltage level provided to the lighting system;
   wherein the processor is further configured to generate the PFC control signal in response to the input voltage level represented by the input voltage feedback signal and to generate the LED drive current control signal in response to the one or more current levels represented by the LED current feedback signal.

3. The lighting system of claim 1 wherein the digital supply voltage has an absolute value less than or equal to 8 volts, the medium level supply voltage has an absolute value less than or equal to 50 volts, and the high voltage PFC switch is coupled between voltage nodes having a voltage difference during normal operation of the lighting system of at least 100 volts, and the high voltage LED drive current switch is coupled between voltage nodes having a voltage difference during normal operation of the lighting system of at least 100 volts.

4. The lighting system of claim 1 wherein during normal operation of the lighting system, the medium level voltage is less than or equal to approximately 15% of the voltage at the first high voltage source node relative to a voltage at the common voltage reference node.

5. The lighting system of claim 1 further comprising:
   a dimmer signal input to receive a dimmer signal;
   wherein the controller is configured to:
      control power delivered by a switching power converter to a switching LED system; and
      concurrently modify power demand by the power factor correction control system and modify power supplied by the switching power converter in accordance with changes in a dimming level indicated by the dimmer signal.

6. The lighting system of claim 5 wherein the controller comprises a first control module to control power factor correction by the switching power converter and a second control module to control power delivered by the switching power converter and both the first and second control modules include inputs to receive the dimmer signal.

7. The lighting system of claim 1 further comprising:
   a common voltage reference node;
   a first high voltage source node to conduct a primary voltage;
   a second high voltage source node to conduct a link voltage of the lighting system;
   the PFC switch coupled to the common voltage reference node and the first high voltage source node; and
   the LED current control switch to control current to at least one LED, wherein the LED current control switch is coupled to the common voltage reference node and the second high voltage source node;
   wherein, during normal operation of the lighting system, the PFC switch and an LED current control switch of the LED lighting system have respective control node-to-common node, absolute voltages that allow the controller to control the conductivity of the switches and provide power factor correction and supply an approximately constant current to an LED switching system for each dimming level indicated by a dimmer signal.

8. The lighting system of claim 7 wherein the control node-to-common node voltages of the PFC switch and the LED current control switch are less than or equal to 0.15 times a voltage at the first voltage source node relative to a voltage at the common voltage reference node.

9. The lighting system of claim 7 wherein:
the PFC switch and the LED current control switch are members of the group consisting of: field effect transistors and insulated gate bipolar transistors;
the control nodes of the PFC switch and the LED current control switch are members of the group consisting of: a field effect transistor gate node and an insulated gate bipolar transistor gate node; and
the common nodes of the PFC switch and the LED current control switch are members of the group consisting of: a field effect transistor source node and an insulated gate bipolar transistor emitter.

10. The lighting system of claim 7 further comprising:
a third voltage source node to conduct a third voltage, wherein the third voltage is lower than the link voltage and the supply voltage; and
one or more transistors coupled to the third voltage source node and the common voltage reference node, wherein the one or more transistors operate from voltages at the third voltage source node and the common voltage reference node.

11. The lighting system of claim 7 further comprising:
a current sense device coupled to the LED drive current switch node and the common voltage reference node and, during normal operation of the lighting system, having a voltage across the current sense device less than or equal to 0.15 times a voltage at the first voltage source node relative to the voltage at the common voltage reference node and provides a feedback signal for controlling the LED current control switch.

12. The lighting system of claim 11 wherein the current sense device is a resistor.

13. The lighting system of claim 11 further comprising:
a plurality of LED drive current switches, wherein each LED drive current switch controls current to at least one LED and is coupled to the common voltage reference node, the first voltage source node, and the controller; and
a single current sense device coupled to the LED drive current switches, wherein, during normal operation of the lighting system, the current sense device senses current in all of the LED drive current switches and provides a feedback signal for use by the controller to control current in all of the LED current control switches.

14. The lighting system of claim 13 further comprising:
multiple LED chains comprising one or more LEDs, wherein each LED chain is coupled to one of the current sense devices.

15. A method comprising:
operating a digital signal processor of a power factor correction (PFC) and output voltage controller from a digital level supply voltage;
generating a PFC control signal; and
generating an LED current control signal;
operating a first buffer, coupled to the processor, from a medium level supply voltage, wherein the medium level supply voltage is greater than the digital level supply voltage;
receiving the PFC control signal;
converting the PFC control signal into a PFC switch control signal to control conductivity of a high voltage PFC switch; and
operating a second buffer, coupled to the processor, from the medium level supply voltage;
receiving the LED current control signal; and
converting the LED current control signal into an LED current control switch signal to control conductivity of a high voltage LED current control switch.

16. The method of claim 15 wherein the controller includes an LED feedback node to receive an LED current feedback signal representing one or more current levels in one or more switching LED systems and a voltage feedback node to receive an input voltage feedback signal representing an input voltage level provided to the lighting system, the method further comprising:
generating the PFC control signal in response to the input voltage level represented by the input voltage feedback signal; and
generating the LED drive current control signal in response to the one or more current levels represented by the LED current feedback signal.

17. The method of claim 15 wherein the digital supply voltage has an absolute value less than or equal to 8 volts, the medium level supply voltage has an absolute value less than or equal to 50 volts, and the high voltage PFC switch is coupled between voltage nodes having a voltage difference during normal operation of the lighting system of at least 100 volts, and the high voltage LED drive current switch is coupled between voltage nodes having a voltage difference during normal operation of the lighting system of at least 100 volts.

18. The method of claim 15 further comprising:
generating a first voltage, wherein the first voltage is a link voltage;
operating a switching power converter of an LED lighting power system from the first source voltage relative to a common voltage, wherein the switching power converter includes the PFC switch;
operating the PFC switch at a control node-to-common node, absolute voltage to allow the PFC and output voltage controller to control the PFC switch and provide power factor correction for the switching power converter;
operating the LED current control switch at a control node-to-common node, absolute voltage to allow the PFC and output voltage controller to control the LED current control switch to supply an approximately constant current to an LED switching system for each dimming level indicated by a dimmer signal; and
controlling conductivity of the PFC switch and the LED current control switch with the PFC and output voltage controller.

19. The method of claim 18 wherein:
operating the PFC switch of the switching power converter at a control node-to-common node, absolute voltage to allow a PFC and output voltage controller to control the PFC switch and provide power factor correction for the switching power converter comprises operating the PFC switch of the LED lighting power system at a control node-to-common node, absolute voltage less than or equal to 0.15 times the first source voltage relative to the common voltage reference; and
operating the LED current control switch at a control node-to-common node, absolute voltage to allow the PFC and output voltage controller to control the LED current control switch to supply an approximately constant current to an LED switching system for each dimming level indicated by a dimmer signal comprises operating the LED current control switch at a control node-to-common node, absolute voltage less than or equal to 0.15 times the first source voltage relative to the common voltage reference.

20. The method of claim 18 wherein the PFC and LED current control switches comprise field effect transistors and controlling conductivity of the PFC switch and LED current control switch with the PFC and output voltage controller comprises providing respective duty cycle modified control signals to gates of the PFC switch and LED current control switch.

21. The method of claim 18 further comprising:
receiving a rectified primary supply voltage, wherein a root mean square (RMS) value of the primary supply voltage is greater than the medium level voltage;
boosting the primary supply voltage to the first source voltage, wherein boosting the primary supply voltage further comprises modulating the conductivity of the PFC switch to generate a power factor corrected first source voltage.

22. The method of claim 18 further comprising:
operating additional LED current control switches at respective current node voltages less than or equal to 0.15 times the first source voltage relative to the common voltage reference, wherein each LED current control switch controls current through a respective chain of LEDs and each chain of LEDs includes at least one LED;
receiving feedback signals, wherein each feedback signal represents a respective current conducted by one of the LED current control switches; and
controlling conductivity of each LED current control switch with the PFC and output voltage controller in response to the feedback signal.

23. The method of claim 18 further comprising:
receiving a dimmer signal; and
controlling conductivity of the PFC switch and the LED current control switch further comprises:
concurrently controlling the conductivity of the PFC switch and the LED current control switch to modify power demand by LED lighting power system and modify power supplied by the lighting system in accordance with changes in a dimming level indicated by the dimmer signal.

24. The method of claim 18 wherein the second source voltage is less than or equal to approximately 15% of the first source voltage.

25. The method of claim 18 further comprising:
operating one or more transistors of the PFC and output voltage controller from a third voltage source node and the common voltage reference, wherein the third voltage is lower than the link voltage and the second source voltage.

26. The method of claim 18 wherein a switching LED system includes the LED and controlling conductivity of the LED current control switch further comprises:

receiving a feedback signal from a switching LED system; and
responding to the feedback signal to maintain a predetermined current to each LED.

27. The method of claim 26 further comprising:
sensing a voltage across a resistor representing a current through each LED, wherein the voltage sensed across the resistor is the feedback signal.

28. The method of claim 18 further comprising:
operating additional LED current control switches at respective current node voltages less than or equal to 0.15 times the first source voltage relative to the common voltage reference, wherein each LED current control switch controls current through a respective chain of LEDs and each chain of LEDs includes at least one LED;
receiving a single feedback signal representing current conducted by each LED current control switch; and
controlling conductivity of each LED current control switch with the PFC and output voltage controller in response to the feedback signal.

29. The method of claim 28 wherein controlling conductivity of each LED current control switch with the PFC and output voltage controller in response to the feedback signal comprises:
determining during separate periods of time the respective currents conducted by each LED current control switch.

30. A light emitting diode (LED) lighting system comprising:
an LED lighting power system, wherein during normal operation of the LED lighting system the LED lighting power system generates a first source voltage relative to a common voltage, wherein the first source voltage is a link voltage, and the LED lighting power system includes:
a switching power supply having a power factor correction (PFC) switch, wherein during normal operation of the LED lighting system, the PFC switch of the LED lighting power system operates at a current node voltage less than or equal to 0.1 times the first source voltage relative to the common voltage reference; and
an LED current control switch, wherein during normal operation of the LED lighting system, the LED current control switch operates at a current node voltage less than or equal to 0.1 times the first source voltage relative to the common voltage reference;
a PFC and output voltage controller coupled to conductivity control nodes of the first and LED drive current switches, wherein during normal operation of the lighting control system, the controller operates from a second source voltage relative to the common voltage and controls conductivity of the PFC switch and the LED current control; and
at least one LED coupled to the LED current control switch.

* * * * *